United States Patent
Watanabe

(10) Patent No.: US 12,290,869 B2
(45) Date of Patent: May 6, 2025

(54) TIPPED SAW BLADE

(71) Applicant: KANEFUSA KABUSHIKI KAISHA, Aichi (JP)

(72) Inventor: Tomoaki Watanabe, Aichi-ken (JP)

(73) Assignee: KANEFUSA KABUSHIKI KAISHA, Aichi (JP)

( * ) Notice: Subject to any disclaimer, the term of this patent is extended or adjusted under 35 U.S.C. 154(b) by 379 days.

(21) Appl. No.: 17/777,581

(22) PCT Filed: Dec. 4, 2020

(86) PCT No.: PCT/JP2020/045213
§ 371 (c)(1),
(2) Date: May 17, 2022

(87) PCT Pub. No.: WO2021/124927
PCT Pub. Date: Jun. 24, 2021

(65) Prior Publication Data
US 2023/0020592 A1   Jan. 19, 2023

(30) Foreign Application Priority Data
Dec. 19, 2019   (JP) ................................ 2019-228921

(51) Int. Cl.
*B23D 61/04*   (2006.01)
*B27B 33/08*   (2006.01)

(52) U.S. Cl.
CPC .............. *B23D 61/04* (2013.01); *B27B 33/08* (2013.01)

(58) Field of Classification Search
CPC .............................. B27B 33/08; B23D 61/04
See application file for complete search history.

(56) References Cited

U.S. PATENT DOCUMENTS

| | | | |
|---|---|---|---|
| 9,162,299 B2 | 10/2015 | Kullmann et al. | |
| 2002/0170410 A1* | 11/2002 | Gittel | B23D 61/021 83/835 |
| 2012/0279372 A1 | 11/2012 | Kullmann et al. | |

FOREIGN PATENT DOCUMENTS

| | | |
|---|---|---|
| CA | 2113047 C | 10/1999 |
| DE | 202019106407 U1 | 11/2019 |

(Continued)

OTHER PUBLICATIONS

PCT/JP2020/045213 International Search Report and Written Opinion dated Jan. 26, 2021 (9 p.).

(Continued)

*Primary Examiner* — Liang Dong
(74) *Attorney, Agent, or Firm* — CONLEY ROSE, P.C.

(57) ABSTRACT

A tipped saw blade includes a disc-shaped base metal and a plurality of tips. Each tip has an edge selected from a flat edge, a left beveled edge, and a right beveled edge. The tips are positioned circumferentially adjacent each other about a radially outer periphery of the base metal. Each flat edge includes a cutting edge that is oriented parallel to a thickness direction of the base metal. Each left beveled edge and each right beveled edge include a corresponding cutting edge that is inclined with respect to the thickness direction of the base metal. Cutting edge line lengths correspond to the lengths at which the cutting edges come in contact with a workpiece when cutting a workpiece. The cutting edges have the following relationship: (sum of cutting edge line lengths of the plurality of beveled edges)≤[((cutting edge line length of one of the flat edges)−(kerf thickness+1.5))×(number of the plurality of flat edges)×1.2].

9 Claims, 11 Drawing Sheets

(56) References Cited

FOREIGN PATENT DOCUMENTS

| | | |
|---|---|---|
| GB | 1151382 A | 5/1969 |
| JP | S63169215 U | 11/1988 |
| JP | H06277938 A | 10/1994 |
| JP | H08187702 A | 7/1996 |
| JP | H09290323 A | 11/1997 |
| JP | H1080823 A | 3/1998 |
| JP | H11277330 A | 10/1999 |
| JP | 3212951 B2 | 9/2001 |
| JP | 3370166 B2 | 1/2003 |
| JP | 2004066400 A * | 3/2004 |
| JP | 6163706 B2 | 7/2017 |
| WO | 2019/203346 A1 | 10/2019 |

OTHER PUBLICATIONS

European Extended Search Report dated Dec. 15, 2023, for European Application No. 20903911.4 (8 p.).
PCT/JP2020/045213 International Preliminary Report on Patentability dated Jun. 30, 2022 (6 p.).

* cited by examiner

TIPPED SAW BLADE

CROSS-REFERENCE TO RELATED APPLICATIONS

The present application is a U.S. National Phase entry of, and claims priority to, PCT Application PCT/JP2020/045213, filed Dec. 4, 2020, which claims priority to Japanese Patent Application No. 2019-228921, filed Dec. 19, 2019, both of which are incorporated herein by reference in their entireties for all purposes.

STATEMENT REGARDING FEDERALLY SPONSORED RESEARCH OR DEVELOPMENT

Not applicable.

BACKGROUND

One embodiment of the present disclosure relates to a tipped saw blade with a plurality of tips joined at and around an outer periphery of a disc-shaped base metal. The tipped saw blade serves to cut a workpiece made of, for example, wood and wood-based materials, composite materials thereof, steel materials, and non-ferrous metal materials, such as aluminum.

The tips of a tipped saw blade, each of which has a substantially rectangular parallelepiped shape, are joined at and around a base metal. Each tip has a rake face on a front side of the tip relative to a rotational direction and a cutting edge at an end of the rake face. Rotating the tipped saw blade about an axis extending through the center of the disc of the base metal causes the cutting edges of the tips to cut a workpiece. The plurality of tips repeatedly cut the workpiece to form a groove in the workpiece. As a result, the workpiece can be cut with the tipped saw blade. A segmented cutting type tipped saw blade has been known. With a segmented cutting type tipped saw blade, the workpiece is cut by the cooperation of the plurality of tips. Segmented cutting type tipped saw blades that include tips having various top end profiles are disclosed, for example, in JP3212951B, JP H08-187702A, JP H09-290323A, JP3370166B, JP6163706B, and JP S63-169215U. In these disclosures, various types of tips are aligned in the circumferential direction of the base metal and form groups of tips. A plurality of groups of tips are aligned along a circumferential edge of the base metal.

Each of the tips cuts a different spot of the workpiece depending on each top end profile in the cutting width direction of the groove. For example, three types of tips, each having a different top end profile, may be assigned to cut each area of a groove divided into three sections in the cutting width direction. As a result, chips split in the cutting width direction are produced. The chips split in small pieces can be favorably discharged from the grooves. This results in a reduction of the entry of the chips between the tips and the workpiece, thereby enhancing the cutting efficiency. In addition, each of the tips of the segmented cutting type tipped saw blade has a small contact area with the groove, as each of the tips comes in contact with a predetermined area that is divided in the cutting width direction. The frictional force between the tips and the workpiece will thus be reduced. Accordingly, the cutting resistance is reduced and the required cutting power can be reduced. In addition, a surface of the workpiece that has been cut with the segmented cutting type tipped saw blade will be smooth, as the chips are favorably discharged and the cutting resistance is reduced.

It is generally favorable for the tipped saw blade to have a small cutting resistance as well as a small driving power cutting requirement. For example, the tipped saw blade may be used for a rechargeable tipped saw cutter (electric circular saw). In this case, the consumption of the rechargeable battery can be reduced and the operable time until the next recharging can be extended. Further, the tipped saw blade may be used for a stationary tipped saw cutter (tipped saw cutting machine). In this case, the time required for cutting the workpiece may be shortened. Therefore, there has long been a need for a tipped saw blade having a small cutting resistance as well as having a small required cutting power.

BRIEF SUMMARY

According to one aspect of the present disclosure, a tipped saw blade may include a disc-shaped base metal and a plurality of tips joined at and around an outer periphery of the base metal. The plurality of tips include a plurality of tips with flat edges and a plurality of tips with beveled edges. Each flat edge includes a cutting edge that is oriented parallel to a thickness direction of the base metal. Each beveled edge includes a cutting edge that is inclined relative to the thickness direction of the base metal. A cutting edge line length is a length over which the cutting edge comes in contact with the workpiece when the workpiece is being cut. Given that the feed rate per edge is 0 mm/edge, the cutting edge line length is determined on the basis that the flat edge cuts the workpiece first and each of the beveled edges cuts the workpiece immediately after a corresponding flat edge. The cutting edge line length satisfies the following relationship: (the sum of cutting edge line lengths of the plurality of beveled edges)≤[((the cutting edge line length of one flat edge)−(the kerf thickness of tipped saw blade)+1.5)×(the number of the plurality of flat edges)×1.2].

The beveled edges serve to smoothen lateral surfaces of a groove defining a cut surface of the workpiece. Therefore, it is favorable that the tipped saw blade includes beveled edges. However, without being limited by this or any particular theory, it is believed that the cutting edge line lengths of the flat edges impacts the cutting power more significantly than the cutting edge line lengths of the beveled edges. Adjusting the lengths is not intended to reduce the cutting edge line length of the flat edges. Instead, the intention is to increase the cutting edge line lengths of the flat edges and to reduce the cutting edge line lengths of the beveled edges. Adjusting the cutting edge line lengths of the flat edges has a greater influence on the cutting power. By adjusting the cutting edge line lengths of the flat edges, the cutting power is reduced as compared with conventional designs.

According to another feature of the present disclosure, the tipped saw blade may include a disc-shaped base metal and a plurality of tips joined at and around an outer periphery of the base metal. The plurality of tips include a plurality of tips with flat edges and a plurality of tips with beveled edges. Each flat edge includes a cutting edge oriented parallel to the thickness direction of the base metal. Each of the beveled edges includes a cutting edge that is inclined relative to the thickness direction of the base metal. The lengths where the cutting edges come in contact with the workpiece while the workpiece is being cut are referred to as the cutting edge line lengths. The sum of the cutting edge line lengths of the plurality of beveled edges is less than or equal to two times the sum of the cutting edge line lengths of the plurality of flat edges. Therefore, the sum of the cutting edge line lengths of the plurality of beveled edges is less than that of conventional designs. Also, the sum of the cutting edge line lengths of the plurality of the beveled edges is less than or equal to two times the sum of the cutting edge line lengths of the plurality of flat edges. This allows the cutting power to be less than conventional designs.

According to another aspect of the present disclosure, the tipped saw blade may include a disc-shaped base metal and a plurality of tips joined at and around an outer periphery of the base metal. The plurality of tips include a plurality of tips having a flat edges and a plurality of tips having beveled edges. Each of the flat edges includes a cutting edge oriented parallel to the thickness direction of the base metal. Each of the beveled edges includes a cutting edge that is inclined relative to the thickness direction of the base metal. The lengths where the cutting edges come in contact with the workpiece while the workpiece is being cut are referred to as cutting edge line lengths. The cutting edge line lengths are determined with an assumption that the flat edges cuts the workpiece first and each of the beveled edges cuts the workpiece immediately after the corresponding flat edge cuts the workpiece and with an assumption that the feed rate per edge is 0 mm/edge. The cutting edge line lengths satisfy the following relationship: $A=[((\text{the sum of cutting edge line lengths of the plurality of flat edges})\times 2)+(\text{the sum of cutting edge line lengths of the plurality of beveled edges})]/(\text{the total number of edges of the plurality of flat edges and the plurality of beveled edges})$; and $A<[(\text{the kerf thickness of the tipped saw blade})\times 0.2+0.2]$.

Without being limited by this or any particular theory, it is believed there is a correlation between a cutting edge line-related length and the cutting power. In particular, testing by a named inventor of the present disclosure found that the cutting power could be estimated from the cutting edge line-related length. The plurality of flat edges and the plurality of beveled edges are provided such that the cutting edge line-related length satisfies the above-relationship. As a result, the cutting edge line-related length will be small. Therefore, the cutting power can be reduced.

According to another aspect of the present disclosure, the tipped saw blade includes a plurality of groups of tips including one flat edge and six or more beveled edges aligned in the circumferential direction of the base metal. The height difference between the flat edge and the beveled edges in the radial direction of the base metal is less than or equal to 0.15 mm. An inclination angle of each beveled edge is greater than or equal to 30° and less than 90°.

Accordingly, the groups of tips each include six or more beveled edges for every one flat edge. The sum of the cutting edge lengths of the plurality of left beveled edges is less than or equal to two times the sum of the cutting edge line lengths of the plurality of the flat edges. As a result, the cutting edge line length of each beveled edge is relatively small. In addition, the height difference between the beveled edges with respect to the flat edge is relatively small, such as less than or equal to 0.15 mm in the radial direction of the base metal. In addition, the inclination angle of each beveled edge is relatively large, such as greater than or equal to 30° and less than 90°. The cutting edge lines of the beveled edges intersect the cutting edge line of the flat edge at the locations closer to the left and right ends of the cutting width direction. Therefore, the cutting edge line lengths of beveled edges are smaller, and the cutting power is thus relatively small. Cutting chips generated by cutting the left and right ends of the groove with each of the beveled edges are reduced in size since each cutting edge line length of the beveled edge is reduced. This facilitates the discharge of the cutting chips from the left and right ends of the groove. As a result, a cut surface of the workpiece may be made smoother.

According to another aspect of the present disclosure, the tipped saw blade may include a plurality of left beveled edges and a plurality of right beveled edges. The left beveled edges and the right beveled edges are arranged in an alternating fashion. The left end of the left beveled edge projects radially outward of the base metal as seen in a front view in the circumferential direction (rotation direction) of the cutting edges. The right end of the right beveled edge projects radially outward of the base metal in the front view. Therefore, the groove can be alternately cut on the left and right sides and in a well-balanced manner. In addition, the cutting chips are alternately generated on the left and right sides of the groove. In other words, the cutting chips are produced on the left and right sides of the groove at predetermined time intervals. This allows cutting chips to be smoothly discharged from the both left and right sides of the groove.

DETAILED DESCRIPTION

Figure 1:
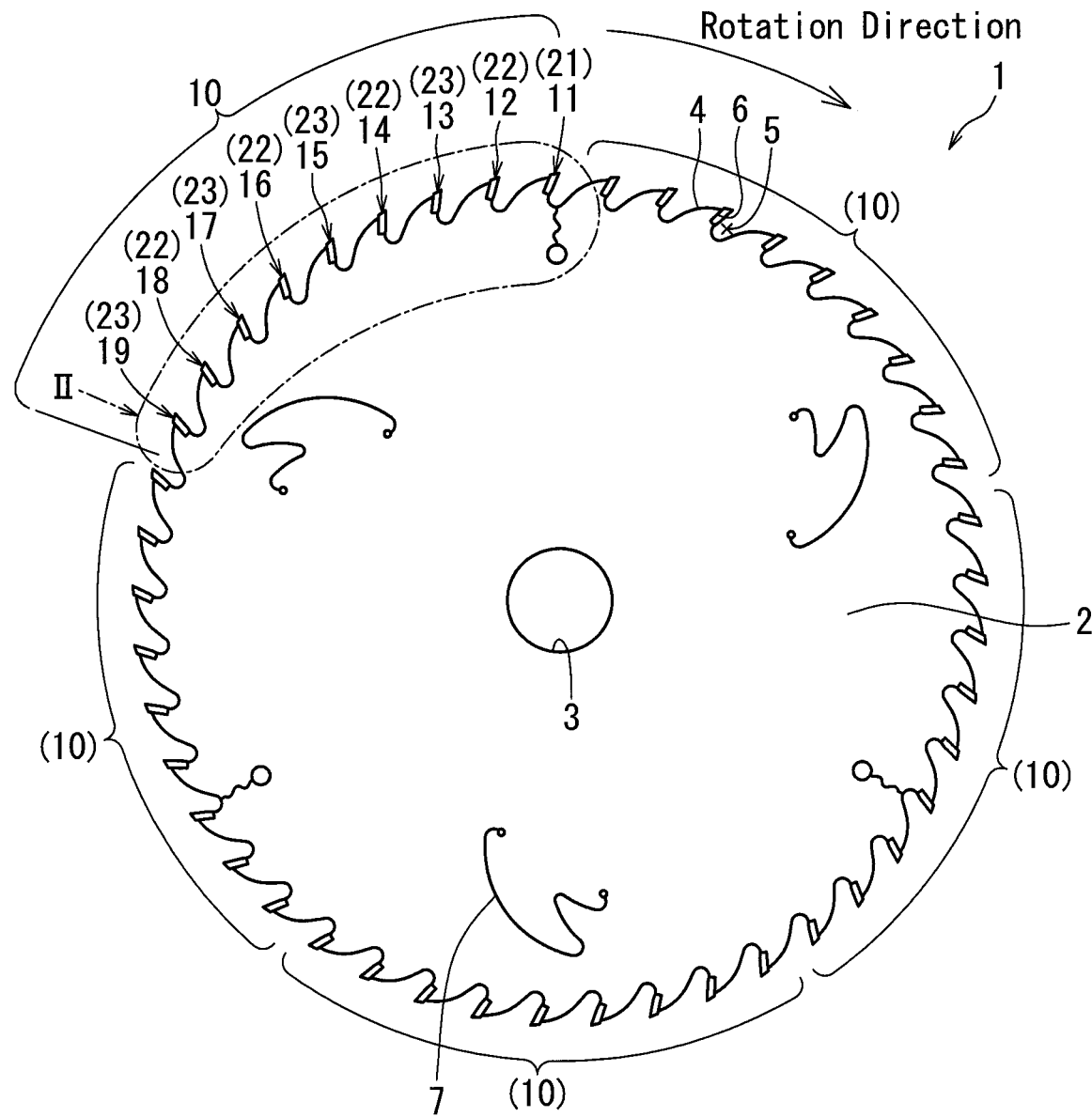
FIG. 1 is a front view of an embodiment of a tipped saw blade in accordance with principles described herein.

An exemplary embodiment of the present disclosure will be described with reference to FIGS. 1 to 12 and 15. As shown in FIG. 1, a tipped saw blade 1 includes a disc-shaped base metal 2, a plurality of circumferentially-adjacent first to ninth tips 11 to 19 joined at and disposed about an outer periphery of the base metal 2. The tipped saw blade 1 is rotatably attached to a cutting tool, such as, for example, a rechargeable battery type electric circular saw, a stationary tipped saw cutting machine, etc. Each of the tips 11-19 of the tipped saw blade 1 is configured to form a groove in a workpiece as the base metal 2 is rotated and the tips 11-19 cuttingly engage the workpiece, thereby allowing the tipped saw blade 1 to cut the workpiece. A workpiece may be made of, for example, wood, a wood-based material, a resin-based material, a composite material, or a steel material, such as carbon steel, rolled steel for general structures, chrome molybdenum steel, stainless steel, cast iron, etc. Alternatively, the workpiece may be made of, for example, a non-ferrous metal, such as, for example, aluminum, aluminum alloys, copper, or copper alloys.

As shown in FIG. 1, a substantially circular mounting hole 3 penetrates the base metal 2 in the thickness direction and is positioned at the center of the base metal 2. A rotary shaft of the cutting tool is inserted into the mounting hole 3, thereby attaching the tipped saw blade 1 to the cutting tool. Rotating the rotary shaft of the cutting tool causes the tipped saw blade 1 to rotate about in a cutting direction of rotation (clockwise direction in FIG. 1) about a central axis of the tipped saw blade 1 and the base metal 2 that passes through the center of the mounting hole 3 of the base metal 2. Thus, the central axis defines the rotational axis of the tipped saw blade 1, an axial direction, and the thickness direction of the base metal 2. A plurality of circumferentially-adjacent projections 4 extend radially outward from the base metal 2 at and along the radially outer peripheral edge of the base metal 2 at predetermined circumferential intervals. A recess or gullet 5 is provided between each pair of circumferentially-adjacent projections 4. Each gullet 5 has substantially the same shape. Each projection 4 has a tip seat 6 with a front end facing in the cutting direction of rotation of the tipped saw blade 1. Each tip seat 6 has a rectangular shape. Each of the first to ninth tips 11 to 19 is bonded to a corresponding tip seat 6. The first to ninth tips 11 to 19 are arranged at uniform intervals in the circumferential direction of the base metal 2. A plurality of meandering vibration damping slots 7 are formed in the base metal 2.

Figure 2:
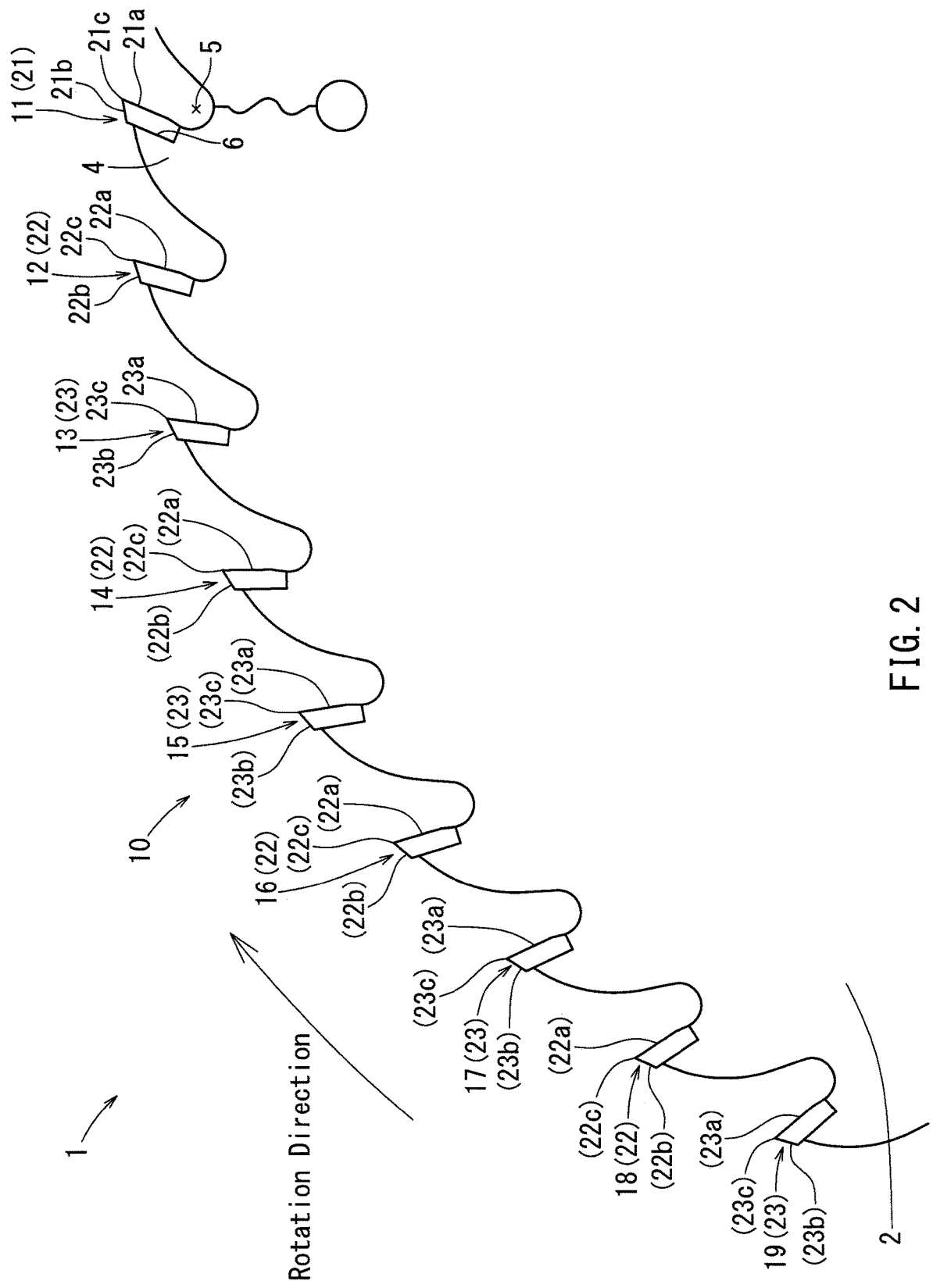
FIG. 2 is an enlarged front view of the tipped saw blade of FIG. 1 taken in section II of FIG. 1.

As shown in FIG. 2, the first to ninth tips 11 to 19 form a group of tips 10 lined up along the outer periphery of the base metal 2. The first tip 11, second tip 12, third tip 13, fourth end tip 14, fifth tip 15, sixth tip 16, seventh tip 17, eighth tip 18, and ninth tip 19 are arranged in this order from the front of the rotation direction of the tipped saw blade 1. Each of the tips 11 to 19 is joined at the base metal 2 in a posture with its rake face substantially oriented to the circumferential direction of the base metal 2. Each of the tips 11 to 19 may be made of, for example, a cemented carbide, cermet, or polycrystalline diamond. Alternatively, each of the tips 11 to 19 may be made of, for example, a cemented carbide or cermet with a surface treatment such as a coating, etc.

Figure 3:
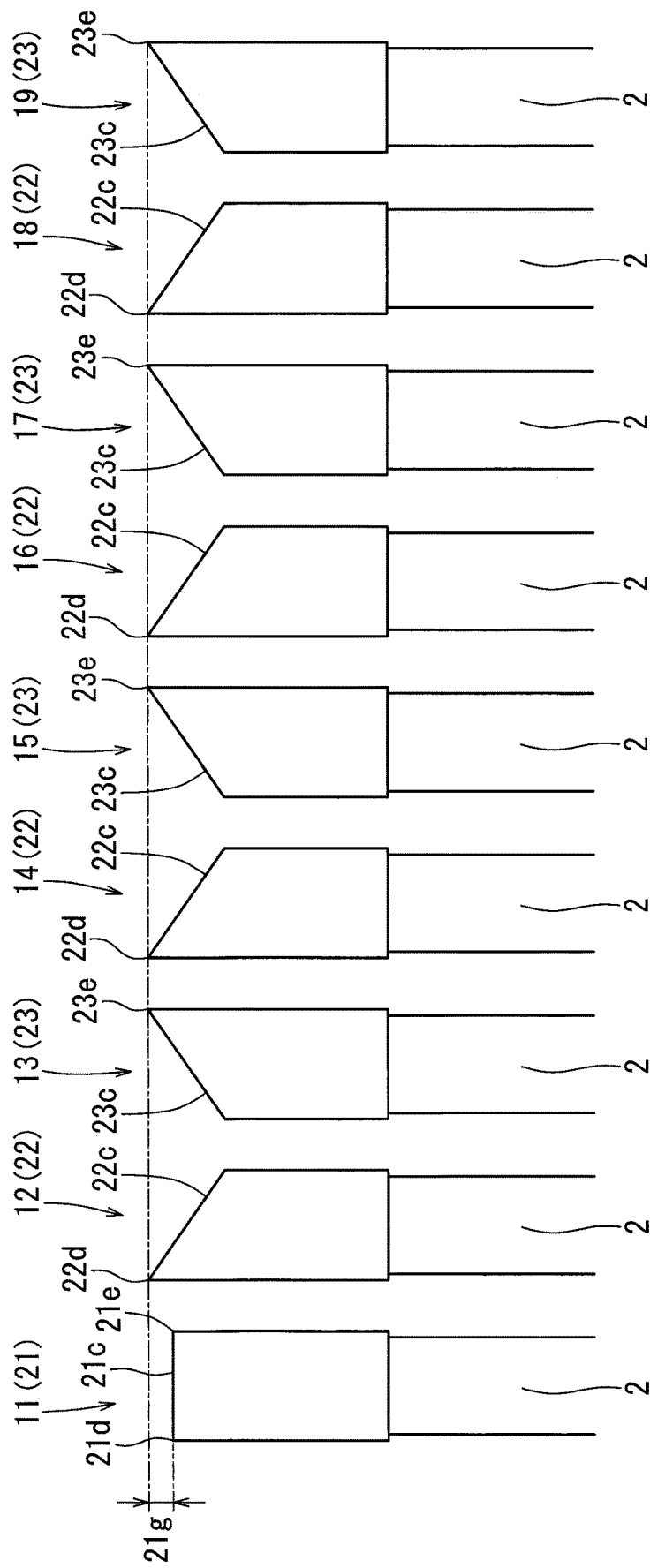
FIG. 3 is a view of each of tip of one group of tips of the tipped saw blade of FIG. 1 as seen in a circumferential direction of the base metal.

As shown in FIG. 3, the first tip 11 is defined by a flat edge 21. The second, fourth, sixth, and eighth tips 12, 14, 16, 18 are defined by left beveled edges 22. The third, fifth, seventh, and ninth tips 13, 15, 17, 19 are defined by right beveled edges 23. More specifically, each group of tips 10 is formed with the flat edge 21 circumferentially located in the leading position relative to the rotation direction, and the left beveled edges 22 and right beveled edges 23 are arranged in a circumferentially alternating behind the flat edge 21.

As shown in FIG. 2, the flat edge 21 has a rake face 21a on its front side relative to the rotation direction. The rake angle of the rake face 21a is about 15° with respect to a radial direction of the base metal 2. In addition, the flat edge 21 has a radially outer flank 21b. A cutting edge 21c is formed at the intersection of the rake face 21a and the flank 21b. As shown in FIG. 3, the cutting edge 21c is horizontally oriented with respect to the thickness direction of the base metal 2.

Figure 4:
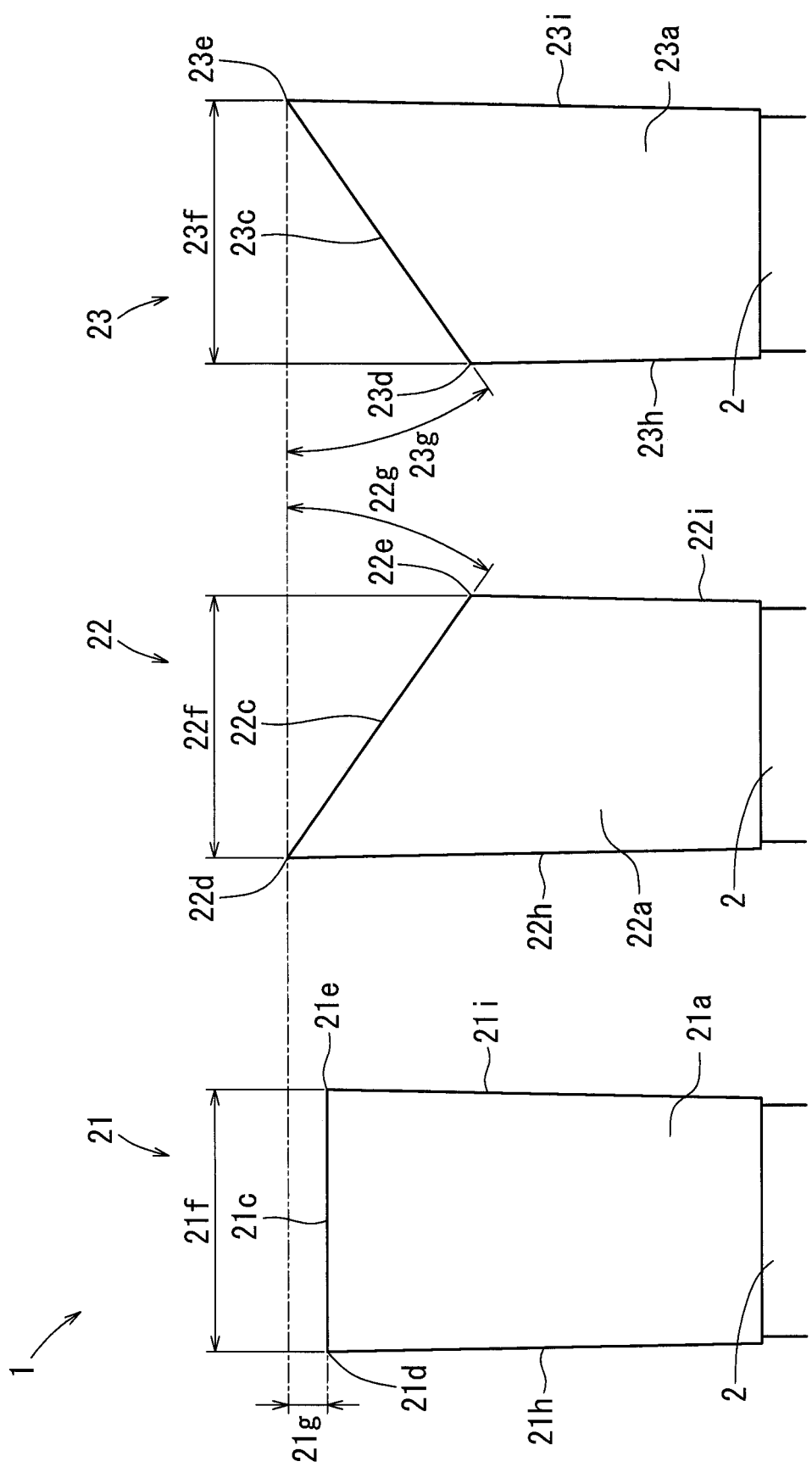
FIG. 4 is an enlarged view of a flat edge and two beveled edges of the tipped saw blade of FIG. 1 as seen in the circumferential direction of the base metal.

As shown in FIG. 4, the flat edge 21 has a left end 21d and a right end 21e. The left end 21d is located at a left front end in front view relative to the rotation direction with the cutting edge 21c located at the top. The right end 21e is located at a right front end in front view relative to the rotation direction with the cutting edge 21c located at the top. The width or thickness 21f of the flat edge 21 is the distance measured from the left end 21d to the right end 21e in the thickness direction of the base metal 2. The width or thickness of the kerf cut by the tipped saw blade 1 (kerf thickness T) is defined by the distance measured from a left end 22d of the left beveled edge 22 to a right end 23e of the right beveled edge 23 when the group 10 of tips 11 to 19 are viewed in front view relative to the relative to the rotation direction. The kerf thickness T may be, for example, 1 to 2 mm when the outer diameter of the base metal 2 (see FIG. 1) is 100 to 255 mm. More specifically, the kerf thickness T may preferably be 1.3 mm to 1.5 mm.

As shown in FIG. 4, the flat edge 21 includes a left side face 21h extending radially inward from the left end 21d and a right side face 21i extending radial inward from the right end 21e. The left side face 21h and the right side face 21i taper inward toward each other moving radially inward from corresponding ends 21d, 21e, respectively. More specifically, both the left side face 21h and the right side face 21i are oriented at an inclination angle (radial clearance angle) relative to the radial direction of the base metal 2 in front view of less than or equal to 2°, for example, 30'. This slight inclinations of side faces 21h, 21i reduces the contact surface area between the workpiece and the left side face 21h and the right side face 21i such that the cutting resistance is reduced. Furthermore, since the left side face 21h and right side face 21i are inclined to such an extent that they do not slope too far from the cut surface of the workpiece, a smooth cut surface finish can be achieved.

As shown in FIGS. 2 and 4, the left beveled edge 22 has a rake face 22a on its front side relative to the rotation direction and a radially outer flank 22b that are similar to the rake face 21a and the flank 21b, respectively, of the flat edge 21. The cutting edge 22c of the left beveled edge 22 is formed at the intersection of the rake face 22a and the flank 22b. The left beveled edge 22 has a left end 22d and a right end 22e. The left end 22d is located on the left front end in front view relative to the rotation direction with the left beveled edge 22 located on the top. The right end 22e is located at the right front end in front view relative to the rotation with the left beveled edge 22 located on the top. The left end 22d projects radially outward from the base metal 2 further than the right end 22e. In addition, the left end 22d is located further radially outward of the base metal 2 by a radial height difference 21g relative to the cutting edge 21c of the flat edge 21. The radial height difference 21g may be less than or equal to 0.15 mm, for example 0.05 to 0.1 mm.

As shown in FIG. 4, the cutting edge 22c of the left beveled edge 22 is oriented at an inclination angle (sharpening angle) 22g relative to horizontal and flat edge 21 in front view. The inclination angle 22g is greater than or equal to 30° and less than 90°. Preferably, the inclination angle 22g is greater than or equal to 30°, and less than or equal to 65°, for example, 30°, 35°, 40°, or 45°. The width or thickness 22f of the left beveled edge 22 is the distance measured from the left end 22d to the right end 22e in the thickness direction of the base metal 2. The left beveled edge 22 includes a left side face 22h extending radially inward from the left end 22d and a right side face 22i extending radially inward from the right end 22e. The left side face 22h and the right side face 22i taper inward toward each other moving radially inward from corresponding ends 22d, 22e, respectively. More specifically, both the left side face 22h and the right side face 22i are oriented at an inclination angle (radial clearance angle) relative to the radial direction of the base metal 2 in front view of less than or equal to 2°, for example, 30'.

As shown in FIGS. 2 and 4, the right beveled edge 23 has a rake face 23a on its front side relative to the rotation direction and a radially outer flank 23b, similar to the rake face 21a and the flank 21b, respectively, of the flat edge 21. The cutting edge 23c of the right beveled edge 23 is formed at the intersection of the rake face 23a and the flank 23b. The right beveled edge 23 has a left end 23d and a right end 23e. The left end 23d is located at the left front end in front view relative to the rotation direction with the cutting edge 23c located on the top. The right end 23e is located at a right front end in front view relative to the rotation direction with the cutting edge 23c located on the top. The right end 23e projects radially outward from the base metal 2 further than the left end 23d. In addition, the right end 23e is located radially outward of the base metal 2 by a radial height difference 21g relative to the cutting edge 21c of the flat edge 21. The radial height difference 21g may be less than or equal to 0.15 mm, for example 0.05 to 0.1 mm.

As shown in FIG. 4, the cutting edge 23c of the right beveled edge 23 is oriented at an inclination angle 23g relative to horizontal and flat edge 21 in front view. The inclination angle 23g is greater than or equal to 30° and less than 90°. Preferably, the inclination angle 23g is greater than or equal to 30° and less than or equal to 65°, for example, 30°, 35°, 40°, 45°. The width or thickness 23f of the right beveled edge 23c is the distance measured from the left end 23d to the right end 23e in the thickness direction of the base metal 2. The right beveled edge 23 has a left side face 23h extending radially inward from the left end 23d and a right side face 23i extending radially inward from the right end 23e. The left side face 23h and the right side face 23i taper inward toward each other moving radially inward from corresponding ends 23d, 23e, respectively. More specifically, both the left side face 23h and the right side face 23i are oriented at an inclination angle relative to the radial direction of the base metal 2 in front view of less than or equal to 2°, for example, 30'.

Figure 5:
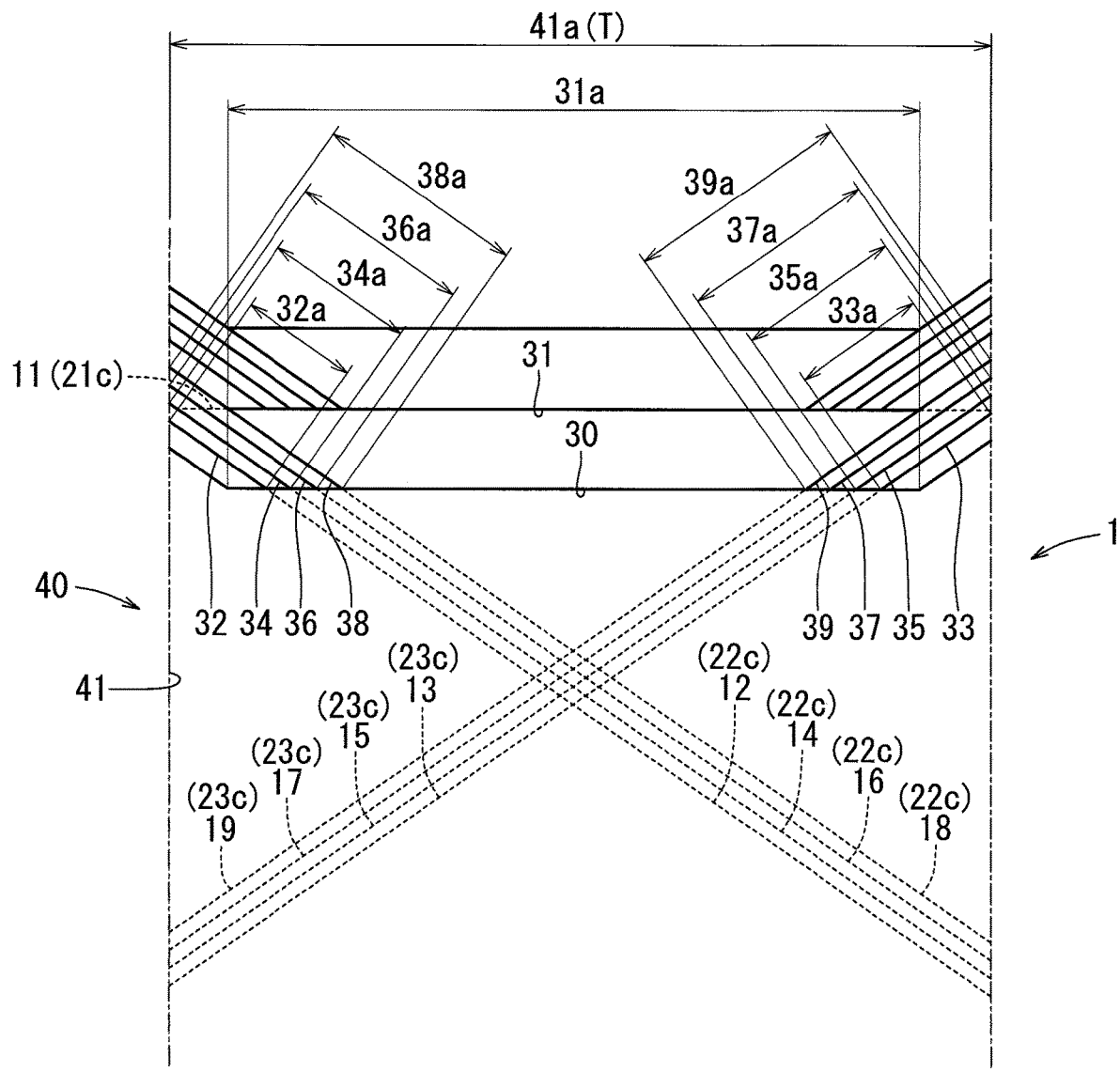
FIG. 5 is a view of a cutting edge line of each tip of the tipped saw blade of FIG. 1 and a workpiece as seen in the circumferential direction taking a feed material into account.

A series of cuts in a workpiece 40 with each of the tips 11 to 19 to form a groove 41 will now be described with reference to FIG. 5. The cutting edges 21c to 23c of each of the tips 11 to 19 cut the workpiece 40 in sequence as the tipped saw blade 1 rotates about its central axis. As shown in FIG. 5, the tipped saw blade 1 travels upward as it moves further into the workpiece 40. The groove 41 is formed and has a cutting width 41a with substantially the same length as the kerf thickness T. The cutting edge 21c of the first tip 11 cuts the workpiece 40 to form a cutting edge line 30 oriented parallel to the cutting width direction of the groove 41.

As shown in FIG. 5, each of the cutting edges 22c, 23c of the second to ninth tips 12 to 19 cuts the workpiece 40 in sequence while the tipped saw blade 1 proceeds as shown in FIG. 5. The cutting edge 22c of the second tip 12 cuts the left end of the groove 41 to a position that is advanced further from the first tip 11 to form a cutting edge line 32. The cutting edge line 32 is formed on a side of the previously formed cutting edge line 30 further upward as shown in FIG. 5. The cutting edge line 32 inclines and is oriented at the inclination angle 22g (see FIG. 4) with respect to the cutting width direction of the groove 41. The cutting edge line 32 formed by the second tip 12 intersects the cutting edge line 30 formed by the first tip 11 and extends upward and to the left end of the groove 41. The cutting edge 23c of the third tip 13 cuts the right end of the groove 41 to form a cutting edge line 33 to a position that is further advanced than the cutting edge line 32 formed by the second tip 12. A cutting edge line 33 of the third tip 13 is formed on the upper side of the cutting edge line 30 formed by the first tip 11 in FIG. 5. The cutting edge line 33 inclines and is oriented at the inclination angle 23g (see FIG. 4) with respect to the cutting width direction of the groove 41. The cutting edge line 33 formed by the third tip 13 intersects the cutting edge line 30 formed by the first tip 11 and extends upward and to the right end of the groove 41.

As shown in FIG. 5, each of the cutting edges 22c of the fourth tip 14, sixth tip 16, and eighth tip 18 cuts the left end of the groove 41 to form cutting edge lines 34, 36, 38, respectively. The cutting edge lines 34, 36, 38 are formed above the cutting edge line 32 formed by the second tip 12 in FIG. 5 at substantially equal intervals. The cutting edge lines 34, 36, 38 are oriented parallel to the cutting edge line 32 formed by the second tip 12. The cutting edge lines 34, 36, 38 intersect the cutting edge line 30 formed by the first tip 11 and extend up to the left end of the groove 41. As a result, the groove 41 has, at its left end, a cut surface in the workpiece 40 forming a left side of a substantially trapezoidal shape. The cutting edge line 30 formed by the first tip 11 and each of the cutting edge lines 32, 34, 36, 38 formed by the second tip 12, fourth tip 14, sixth tip 16, and eighth tip 18 form the left end of an outer periphery of the groove 41. Chips are cut out of the workpiece 40.

Each of the cutting edges 23c of the fifth tip 15, seventh tip 17, and ninth tip 19 cuts the right end of the groove 41 to form the cutting edge lines 35, 37, 39, respectively. The cutting edge lines 35, 37, 39 formed by the fifth tip 15, seventh tip 17, and ninth tip 19 are formed above the cutting line 33 formed by the third tip 13 in FIG. 5 at substantially equal intervals. The cutting edge lines 35, 37, 39 are oriented parallel to the cutting edge line 33 formed by the third tip 13. The cutting edge lines 35, 37, 39 intersect the cutting edge line 30 formed by the first tip 11 and extend up to the right end of the groove 41. As a result, the groove 41 has, at its right end, a cut surface in the workpiece 40 forming a right side of a substantially trapezoidal shape. The cutting edge line 30 formed by the first tip 11 and each of the cutting edge lines 33, 35, 37, 39 formed by the third tip 13, fifth tip 15, seventh tip 17, and ninth tip 19 form the right end of the outer periphery of the groove 41. Chips are cut out of the workpiece 40.

As shown in FIG. 5, the cutting edge 21c of the first tip 11 of a subsequent group of tips 10 (see FIG. 1) cuts the workpiece 40 to form a cutting edge line 31. The cutting edge line 31 is formed above the cutting edge line 30 previously formed by the first tip 11 in FIG. 5 by a predetermined interval from the cutting edge line 30. The cutting edge line 31 is oriented parallel to the cutting width direction of the groove 41 with both right and left ends intersecting the cutting edge lines 38, 39 formed by the eighth tip 18 and ninth tip 19. As a result, the groove 41 has, at its center, a cut surface in the workpiece 40 having a substantially trapezoidal shape with the cutting edge lines 30, 31, 38, 39 formed by the first tip 11, eighth tip 18, and ninth tip 19 forming an outer periphery, chips having been cut out of the workpiece 40. The cutting edge line length 31a of the cutting edge line 31 formed by the first tip 11 and measured in the thickness direction has the same length as the cutting edge line length of the cutting edge line 30 previously formed by the first tip 11, before the workpiece 40 is further cut by each of the cutting edges 22c, 23c of the second to ninth tips 12 to 19.

The cutting edge line length 31a of the cutting edge line 30, 31 formed with the flat edges 21 may be determined by Equation (1) below. The cutting edge lines 32, 34, 36, 38 formed by the left beveled edges 22 have cutting edge line lengths 32a, 34a, 36a, 38a, respectively. The cutting edge lines 33, 35, 37, 39 formed by the right beveled edges 23 have cutting edge line lengths 33a, 35a, 37a, 39a, respectively. The sum L of the cutting edge line lengths 32a to 39a formed by the left beveled edges 22 and the right beveled edges 23 per each set of a group of tips 10 (see FIG. 2) may be determined by Equation (2) below.

Cutting edge line length $31a = T - [((2 \times H) - (3 \times Sz)) \times \cos D / \sin D]$ (Equation 1)

Sum $L = [(K \times (K-1) \times (Sz/2)) + ((K-1) \times H)] / \sin D$ (Equation 2)

Where,

K represents the number of edges in a group of tips 10;

D represents the inclination angle 22g of the left beveled edge 22 and the inclination angle 23g of the right beveled edge 23;

T represents the kerf thickness (mm) of the tipped saw blade 1;

H represents the height difference 21g between the left end 22d and the cutting edge 21c of the flat edge 21 and between the right end 23e and the cutting edge 21c of the flat edge 21 in the radial direction of the base metal 2; and Sz represents a feed rate per edge (mm/edge).

In this embodiment, the tipped saw blade 1 is formed with the following parameters K=9, D=35°, T=1.5 (mm), H=0.1 (mm), and Sz=0.016 (mm/edge). Accordingly, the tipped saw blade 1 has a cutting edge line length 31a=1.283 (mm) and a sum of cutting edge line lengths L=2.399 (mm). More specifically, the sum L of the cutting edge line lengths 32a to 39a of each of the beveled edges 22, 23 is 1.87 times the cutting edge line length 31a of the flat edge 21.

Figure 6:
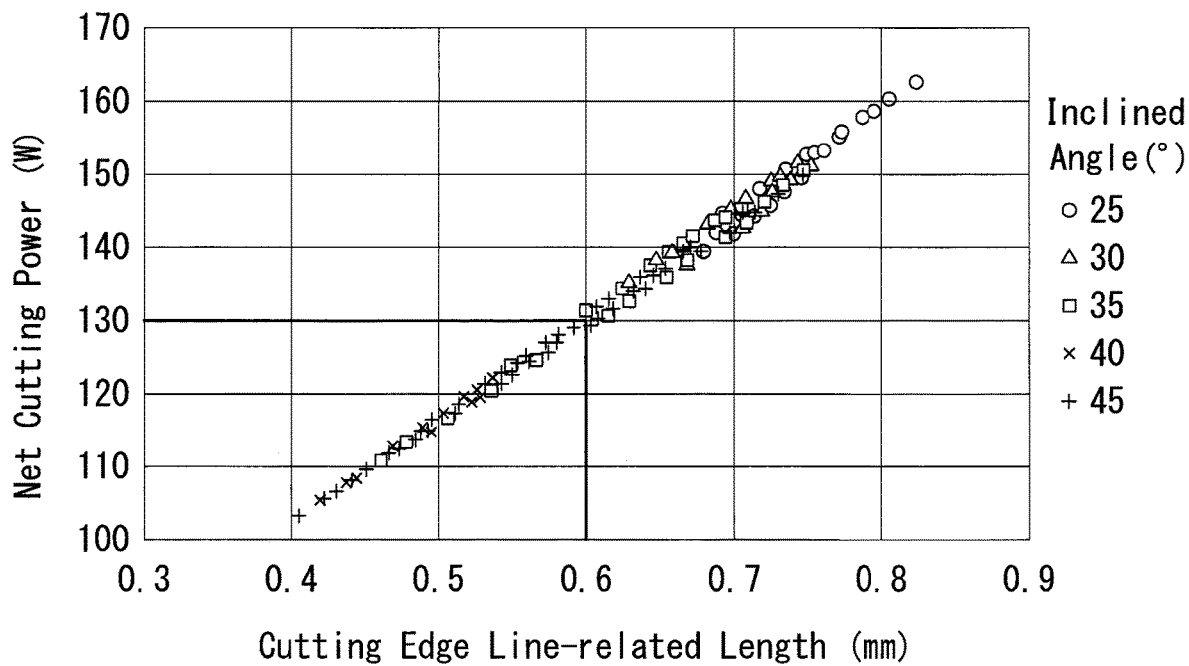
FIG. 6 is a graph illustrating a relationship between a cutting edge line-related length and a cutting power.

The inventor of the present disclosure has performed experiments to measure the cutting power (net cutting power) of a plurality of tipped saw blades 1 that have different cutting edge line lengths of the flat edge 21 and each of the beveled edges 22, 23. In the experiments, for example, the number of edges per groups of the tips 10, the inclination angles 22g, 23g of the left beveled edges 22 and the right beveled edges 23, the height difference 21g between the left beveled edge 22 and the flat edge 21 and between the right beveled edge 23 and the flat edge 21, the kerf thickness T of the tipped saw blade 1, and the feed rate per edge Sz were changed. As shown in FIG. 6, it was found that the cutting edge line related length A, which is defined by Equation (3) below, and the cutting power can be represented by a substantially linear function. When determining the cutting edge line-related length A, the cutting edge line length of the flat edge 21 has twice as much weighting as the left beveled edge 22 and the right beveled edge 23.

Cutting edge line related-length $A = [((\text{cutting edge line length } 31a \text{ of flat edge } 21) \times 2 + (\text{sum } L \text{ of cutting edge line lengths } 32a \text{ to } 39a \text{ of left beveled edge } 22 \text{ and right beveled edge } 23)) / (\text{the number of edges in each group of tips } 10)]$; or Cutting edge line related-length $A = [((\text{sum of cutting edge line lengths } 31a \text{ of all flat edges } 21) \times 2 + (\text{sum of cutting edge line lengths } 32a \text{ to } 39a \text{ of all left beveled edges } 22 \text{ and all right beveled edges } 23)) / (\text{total number of edges of tipped saw blade } 1)]$. (Equation 3)

Figure 9:
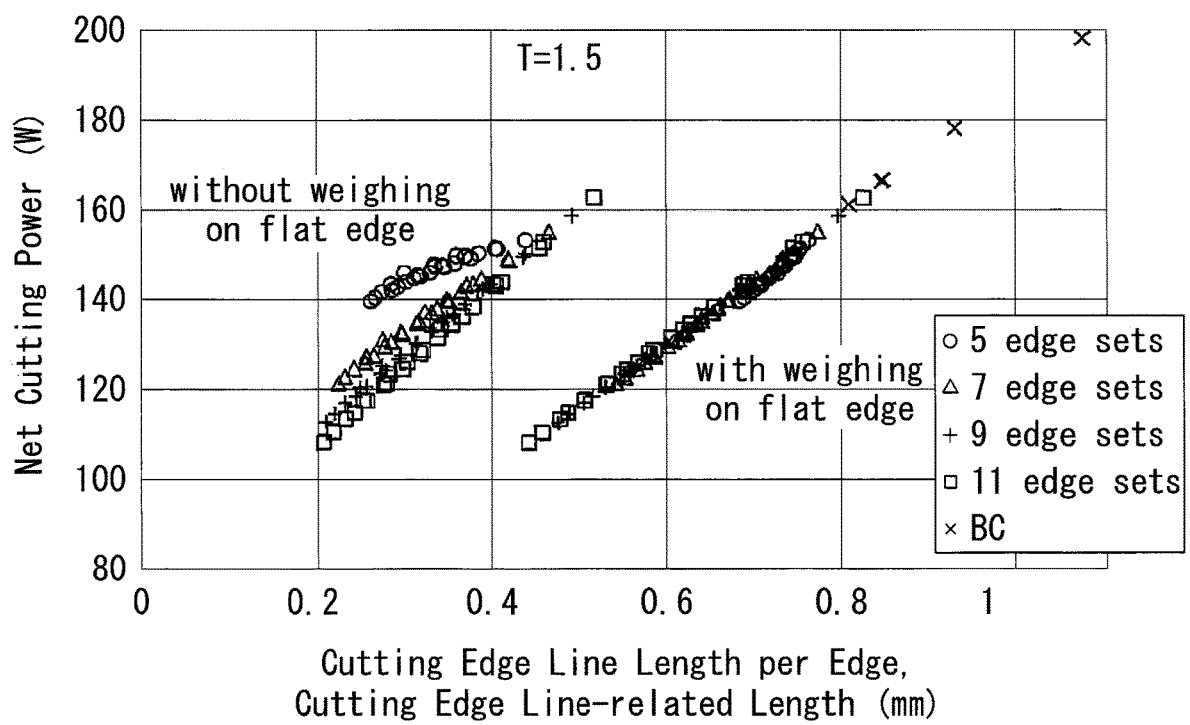
FIG. 9 is a graph illustrating the relationship between a cutting edge line length per edge, a cutting edge line-related length, and the cutting power.

As shown in FIG. 9, simulations were conducted to determine the cutting power when the number of edges per group of tips 10 is changed. It was given that the group of tips 10 includes one flat edge 21 and an equal number of left beveled edges 22 and the right beveled edges 23. Thus, simulations were conducted for the cases where the number of edges per group of tips 10 is 5, 7, 9, 11. In the simulations, the parameters were set such that the kerf thickness T (see FIG. 5) was 1.5 mm and the feed rate per edge Sz was 0.016 mm/edge. The simulation results suggest or indicate that there is a relationship between the cutting power when the cutting edge line-related length A is set to have twice as much weighting on the flat edge 21, as shown in Equation (3), as compared to not having any weighting.

As shown in FIG. 9, even when the cutting edge line-related length A has a weighing on the flat edge 21, the relationship between the cutting power and the linear function was maintained. This was also the case even when the number of edges per set was changed. On the other hand, in the case of the cutting edge line length per edge was set without including the weighing on the flat edge 21, the relationship between the cutting power and the linear function was substantially maintained when the number of edges per group was not changed. However, the relationship between the cutting power and the linear function was not maintained when the number of edges per set was changed. In FIG. 9, BC represents a tipped saw blade with the left beveled edges 22 and the right beveled edges 23 arranged alternately in the circumferential direction but without flat edges 21.

Figure 11:
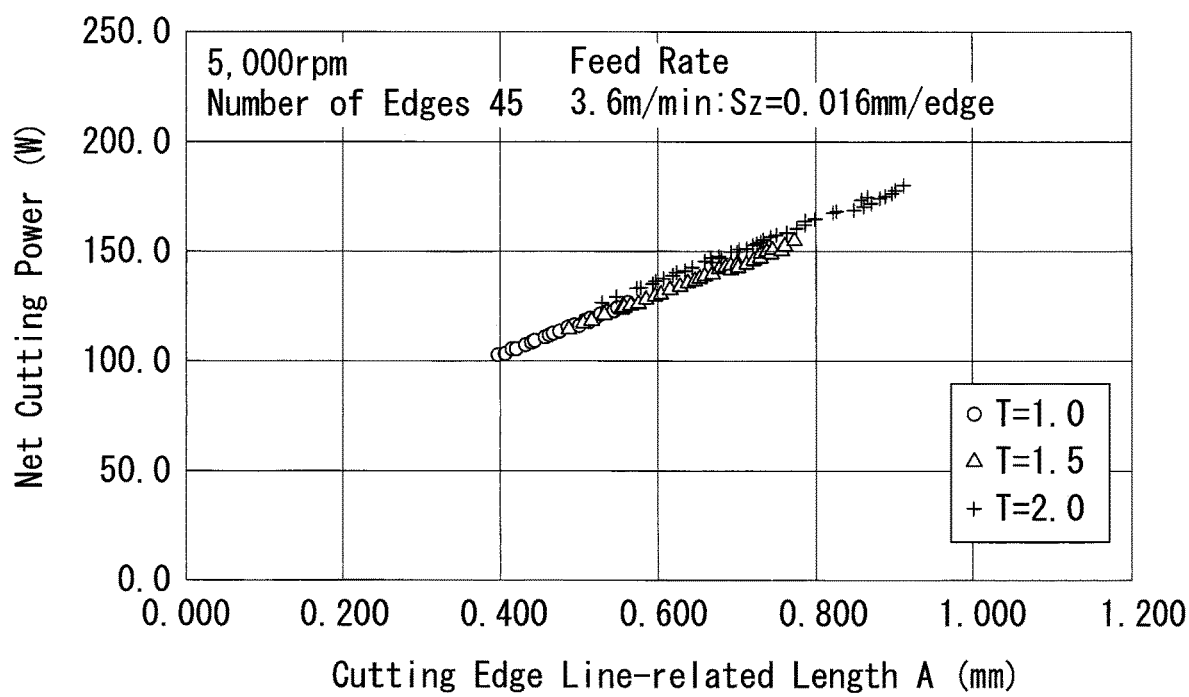
FIG. 11 is a graph illustrating a relationship between the cutting edge line-related length and the cutting power when the kerf thickness is changed.

As shown in FIG. 11, simulations were conducted to determine how the cutting power changes when the kerf thickness T (see FIG. 5) of the tipped saw blade 1 was changed. The simulations were conducted with a kerf thickness T of 1.0 mm, 1.5 mm, and 2.0 mm. In the simulations, the other parameters were set such that the number of rotations per minute was 5,000, the total number of edges was 45, and the feed rate per edge Sz was 0.016 mm/edge. The results of the simulations show that the linear functional relationship between the cutting edge line-related length A and the cutting power was maintained even when the kerf thickness T was changed. The cutting edge line-related length A tended to increase as the kerf thickness T increased. More specifically, when the kerf thickness T was 1.0 mm, the cutting edge line-related length A was about 0.4 to 0.6 mm. When the kerf thickness T was 1.5 mm, the cutting edge line-related length A was about 0.5 to 0.8 mm. When the kerf thickness T was 2.0 mm, the cutting edge line-related length A was about 0.6 to 1.0 mm.

As shown in Equation (1), and in Equation (2), the sum L of the cutting edge line length 31a of the flat edge 21 and the cutting edge line lengths 32a to 39a of the left beveled edges 22 and the right beveled edges 23 vary when the feed rate per edge Sz is changed. Accordingly, the cutting edge line-related length A varies when the feed rate per edge Sz is changed. Therefore, for the purposes Equation (4) and Equation (5) below, the cutting edge line-related length A will be defined with the feed rate per edge Sz set to 0 mm/edge. This makes it possible to verify the relationship between the cutting edge line-related length A and the cutting power is not being affected by the feed rate per edge Sz, which is a machining condition. The sum L of the cutting edge line length 31a of the flat edge 21 and the cutting edge line lengths 32a to 39a of each of the beveled edges 22, 23 can be determined using the following Equation (4) and Equation (5) when the feed rate per edge Sz is set to 0 mm/edge.

$$\text{Cutting edge line length } 31a = T - (2 \times H \times \cos D)/\sin D \quad \text{(Equation 4)}$$

$$\text{Sum } L = ((K-1) \times H)/\sin D \quad \text{(Equation 5)}$$

Figure 15:
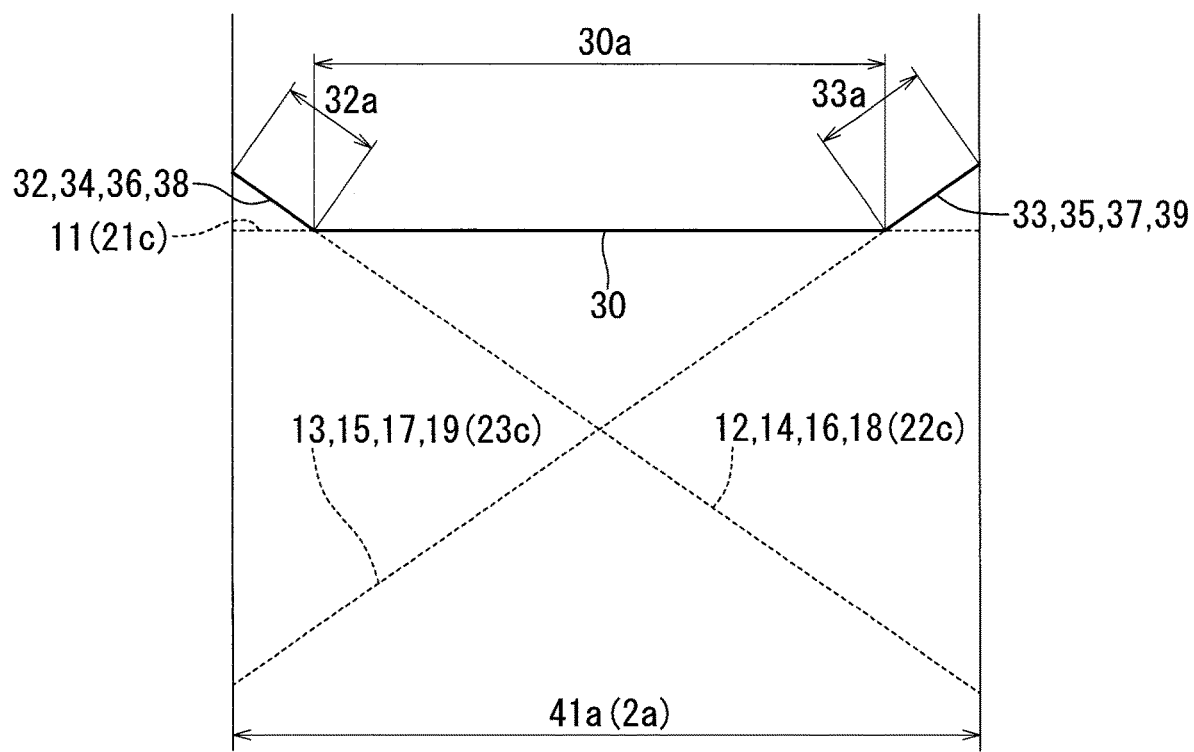
FIG. 15 is a view of cutting edge lines of each of the tips of a tipped saw blade and a workpiece as seen in the circumferential direction.

As shown in FIG. 15, the cutting edge lines 30 to 39 are assumed as follows when the feed rate per edge Sz is set to 0 mm/edge. The cutting edge line 30 is determined to be the cutting edge line formed at the flat edge 21 of the first tip 11 when it is the first tip to cut the workpiece 40. The left beveled edge 22 of the second tip 12 and the right beveled edge 23 of the third tip 12 cut immediately after the flat edge 21 cut the workpiece 40, and thus, the left beveled edge 22 and the right beveled edge 23 form the cutting edge lines 32, 33. These cutting edge lines 32, 33 are assumed to be the cutting edge lines 32 to 39 that are formed by the left beveled edges 22 and the right beveled edges 23 of the second to ninth tips 12 to 19, respectively. The cutting edge line lengths 30a, 32a, 33a are determined from the assumed cutting edge lines 30, 32 to 39.

Figure 10:
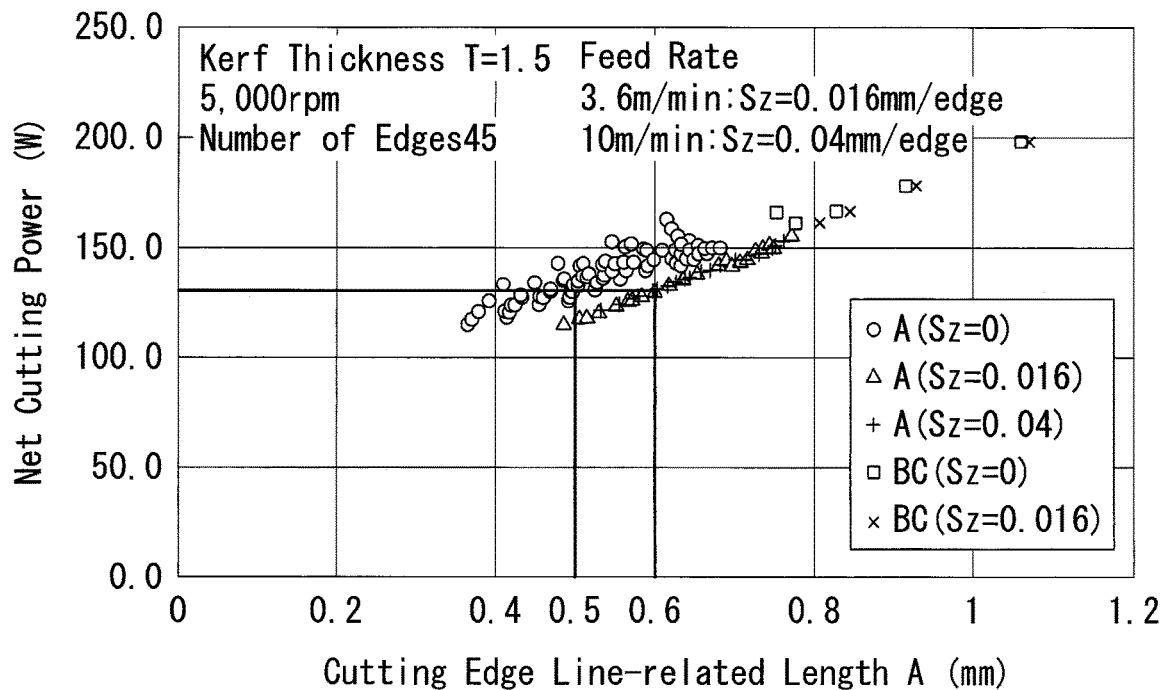
FIG. 10 is a graph illustrating a relationship between the cutting edge line-related length and the cutting power when a feed rate per edge is changed.

As shown in FIG. 10, simulations were conducted to determine how the cutting power changes when the feed rate per edge Sz was changed. The simulations were conducted for the cases in which the feed rate per edge Sz was 0 mm/edge, 0.016 mm/edge, and 0.04 mm/edge. In the simulations, the other parameters were set such that the kerf thickness T (see FIG. 5) was 1.5 mm, the number of rotations per minute was 5,000 times, and the total number of edges was 45. As can be seen from the results of the simulations, substantially the same linear functional relationship between the cutting edge line-related length A and the cutting power was maintained when the feed rate per edge Sz was between 0.016 mm and 0.04 mm/edge. When the feed rate per edge Sz was set to 0 mm/edge, the cutting edge line-related length A was about 0.1 mm smaller at the same cutting power than when the feed rate per edge Sz was 0.016 mm/edge and 0.04 mm/edge. When the feed rate per edge Sz was set to 0 mm/edge, the linear functional relationship between the cutting edge line-related length A and the cutting power was substantially maintained.

As a result of the experiments, it was found that a linear functional relationship between the cutting edge line-related length A and the cutting power can be maintained even when the parameters of the tipped saw blade 1 such as, for example, the inclination angles 22g, 23g of the left beveled edge 22 and the right beveled edge 23 have been changed. Therefore, the cutting power required for cutting can be estimated based on the cutting edge line-related length A. Accordingly, the inventor defined the following Equation (6) for the cutting edge line-related length A, with the feed rate per edge Sz set to 0 mm/edge. In Equation (6), a condition for the cutting power is satisfied when the cutting edge line-related length A is less than a predetermined value. The Equation (6) is defined based on the simulation results shown in FIG. 10.

$$A < (T \times 0.2 + 0.2) \quad \text{(Equation 6)}$$

With the feed rate per edge Sz was set to 0 mm/edge. For example, the cutting edge line-related length A can be set to A=0.425 (mm) for a tipped saw blade 1 with parameters K=9, D=35°, T=1.5 (mm), and H=0.1 (mm). For these parameters, Equation (6) states (T×0.2+0.2)=0.5 (mm). Therefore, the tipped saw blade 1 with the above parameters satisfies the conditions of Equation (6).

Figure 12:
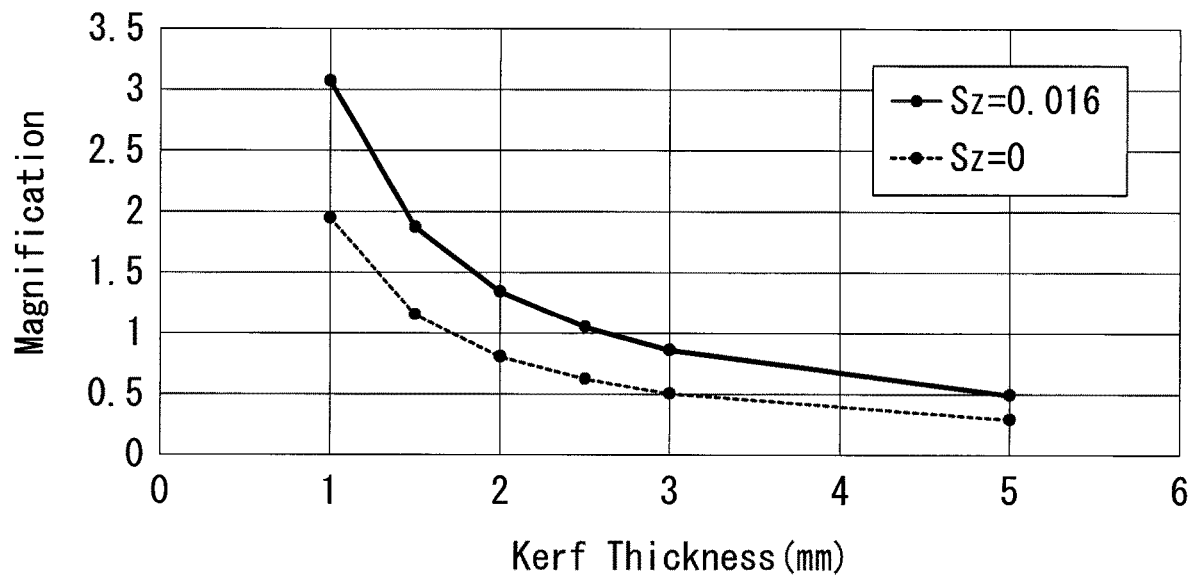
FIG. 12 is a graph illustrating a relationship between a magnification of the total sum of the cutting edge line lengths of the beveled edges with respect to the total sum of the cutting edge line lengths of the flat edges and the kerf thickness.

As shown in Equation (1), the cutting edge line length 31a of the flat edge 21 increases as the kerf thickness T of the tipped saw blade 1 increases. Thus, as shown in FIG. 12, a ratio of the total sum L of the cutting edge line lengths 32a to 39a of each of the beveled edges 22, 23 with respect to the cutting edge line length 31a of the flat edge 21 increase as the kerf thickness T decreases. The ratio of the total sum L of the cutting edge line lengths 32a to 39a of each of the beveled edges 22, 23 with respect to the cutting edge line length 31a of the flat edge 21 increases as the feed rate per edge Sz increases. Accordingly, the inventor defined the following Equation (7) based on the fact that the total sum L of the cutting edge line lengths 32a to 39a of each of the beveled edges 22, 23 should be less than or equal to double of the cutting edge line length 31a of the flat edge 21 when the kerf thickness T is 1.5 mm and the feed rate per edge Sz is 0.016 mm/edge. In Equation (7), the feed rate per edge Sz was set to 0 mm/edge. A following Equation (8) represents the same relationship as Equation (7).

$$\text{(Total sum } L \text{ of the cutting edge line lengths } 32a \text{ to } 39a \text{ of the left beveled edges 22 and the right beveled edges 23 in a group of tips 10)} \leq [((\text{cutting edge line length } 31a \text{ of flat edge 21}) - (\text{kerf thickness } T \text{ of tipped saw blade 1}) + 1.5) \times 1.2] \quad \text{(Equation 7)}$$

$$\text{(Total sum of cutting edge line lengths } 32a \text{ to } 39a \text{ of all left beveled edges and all right beveled edges 23)} \leq [((\text{cutting edge line length } 31a \text{ of flat edge 21 per piece}) - (\text{kerf thickness } T \text{ of tipped saw blade 1}) + 1.5) \times (\text{number of all flat edges 21}) \times 1.2] \quad \text{(Equation 8)}$$

According to Equation (4), the cutting edge line length 31a of the flat edge 21 is 0.714 mm when the feed rate per edge Sz is set to 0 mm/edge and the tipped saw blade 1 has the following parameters K=9, D=35°, T=1.0 (mm), and H=0.1 (mm). The total sum L of cutting edge line lengths 32a to 39a of each of beveled edges 22, 23 per group of tips 10 is 1.395 mm, according to Equation (5). Therefore, according to Equation (7), (0.714−1.0+1.5)×1.2=1.457 (mm), which is greater than 1.395 mm. This suggests that the tipped saw blade 1 satisfies the condition of Equation (7) and at the same time satisfies the condition of Equation (8).

Figure 13:
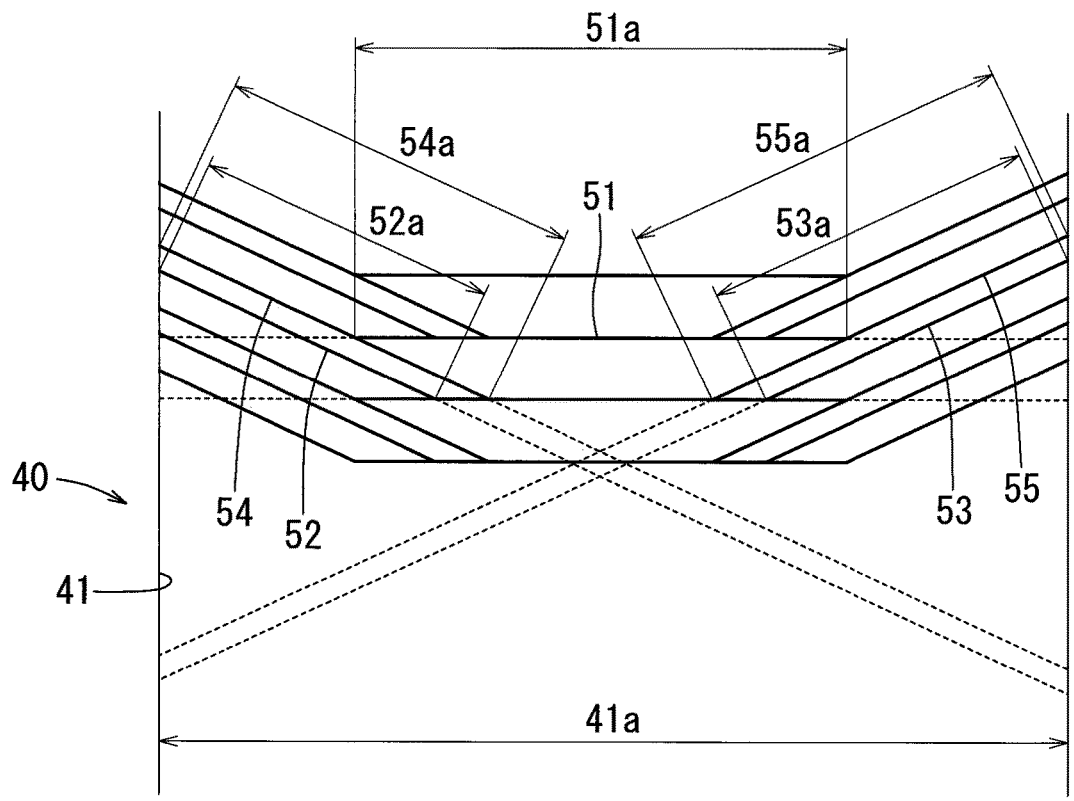
FIG. 13 is a view of the cutting edge lines of a conventional segmented cutting type tipped saw blade and a workpiece as seen in the circumferential direction and taking a feed material into account.

Meanwhile, as shown in FIG. 13, the ratio of the total sum L of the cutting edge line lengths 52a to 55a of the beveled edges 52 to 55 per each group of tips with respect to the cutting edge line length 51a of the flat edge 51 for a conventional segmented cutting type tipped saw blade was greater than that of the tipped saw blade 1. The conventional tipped saw blade may, for example, have the following parameters: the number of edges per group K=5, inclination angle D=25°, kerf thickness T=1.5 (mm), and height difference H=0.2 (mm). According to Equation (4), the cutting edge line length 51a of the cutting edge line 51 of the flat edge is 0.642 (mm) when the feed rate per edge Sz is set to 0 mm/edge. According to Equation (5), the total sum of the cutting edge line lengths 52a to 55a of the cutting edge lines 52 to 55 of the beveled edges is 1.893 (mm). In other words, the total sum L of the cutting edge line lengths 52a to 55a of the beveled edges is about three times that of the cutting edge line length 51a of the flat edge, which is (0.642−1.5+1.5)×1.2=0.771 (mm). This does not satisfy the condition set forth in Equation (7) and Equation (8). According to Equation (3), the cutting edge line-related length A is 0.635 (mm). Therefore, the cutting edge line-related length A is greater than (T×0.2+0.2)=0.5 (mm), which does not satisfy the condition set forth in Equation (6).

Figure 7:
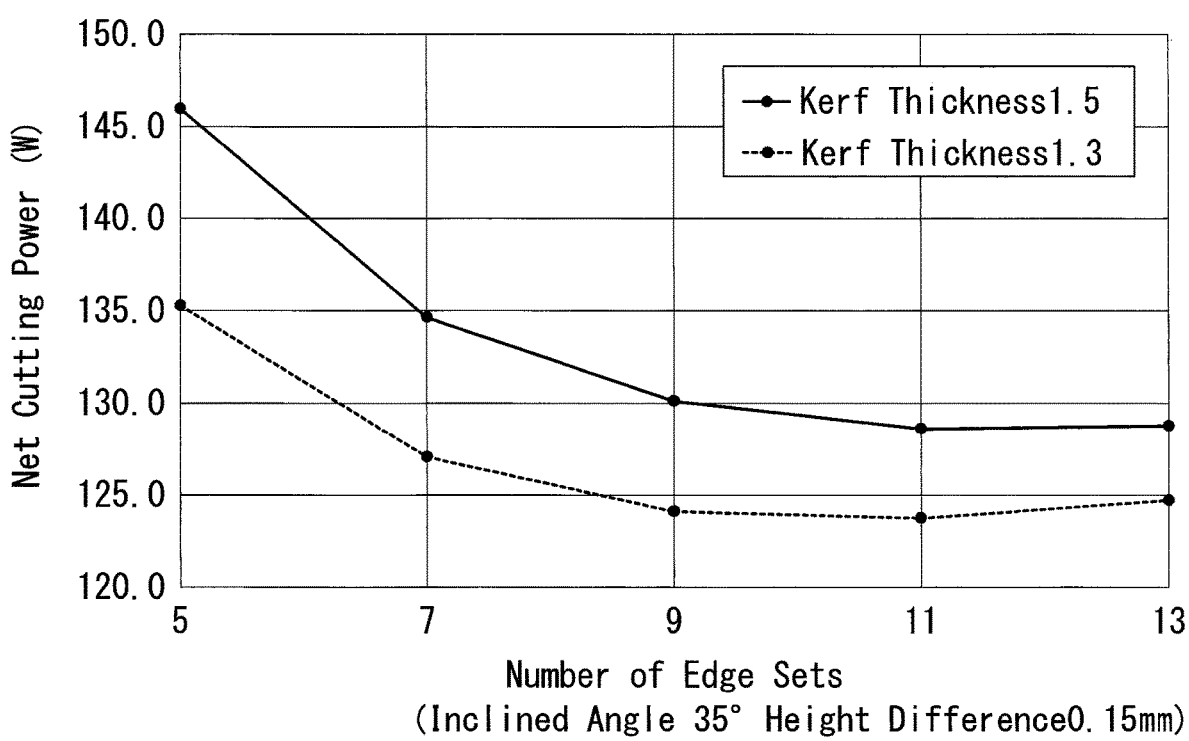
FIG. 7 is a graph illustrating a relationship between the number of edges per group of tips and the cutting power.

The inventor conducted simulations to determine how the cutting power changes with regard to a change in the number of edges per group of tips 10, as shown in FIG. 7. The inventor also conducted simulation to determine how cutting power changes based on the cutting edge line-related length, as shown in FIG. 6, as calculated using Equations (1) to (3). The simulations were conducted for the case in which the number of edges per group of tips 10 was 5, 7, 9, 11, 13. The simulations were conducted on a tipped saw blade 1 with a kerf thickness T of 1.3 mm and a tipped saw blade 1 with a kerf thickness T of 1.5 mm. In the simulations, the inclination angles 22a, 23a were set to 35° and the height difference 21g to 0.15 mm.

The results of the simulation show that the cutting power reduces as the number of edges per group increases in the range in of 5 to 11 edges per group, as shown in FIG. 7. The reduction effect of the cutting power is particularly significant within the range in which the number of edges per group is small. For example when the number of edges per group is changed from 5 to 7, the cutting power reduces 6 to 8%. For example, the cutting power may reduce 1 to 2% when the number of edges per group is change from 9 to 11. The cutting power shows a similar decreasing trend both when the kerf thickness T is 1.3 mm and when it is 1.5 mm.

As shown in FIG. 7, when the number of edge sets is in the range of 11 to 13, the cutting power remained generally unchanged or slightly increased as the number of edges per group increased. The cutting power remains generally unchanged or slightly increases when the number of edges per group is increased to more than 13, due to the increase in the sum of the cutting edge line lengths of the beveled edges. From the above, it was determined that the cutting power can be reduced when the number of edges per group of tips 10 is more than or equal to 7. It was also determined that the reduction effect of the cutting power is significant when the number of edges per group is preferably 7 to 11.

Figure 8:
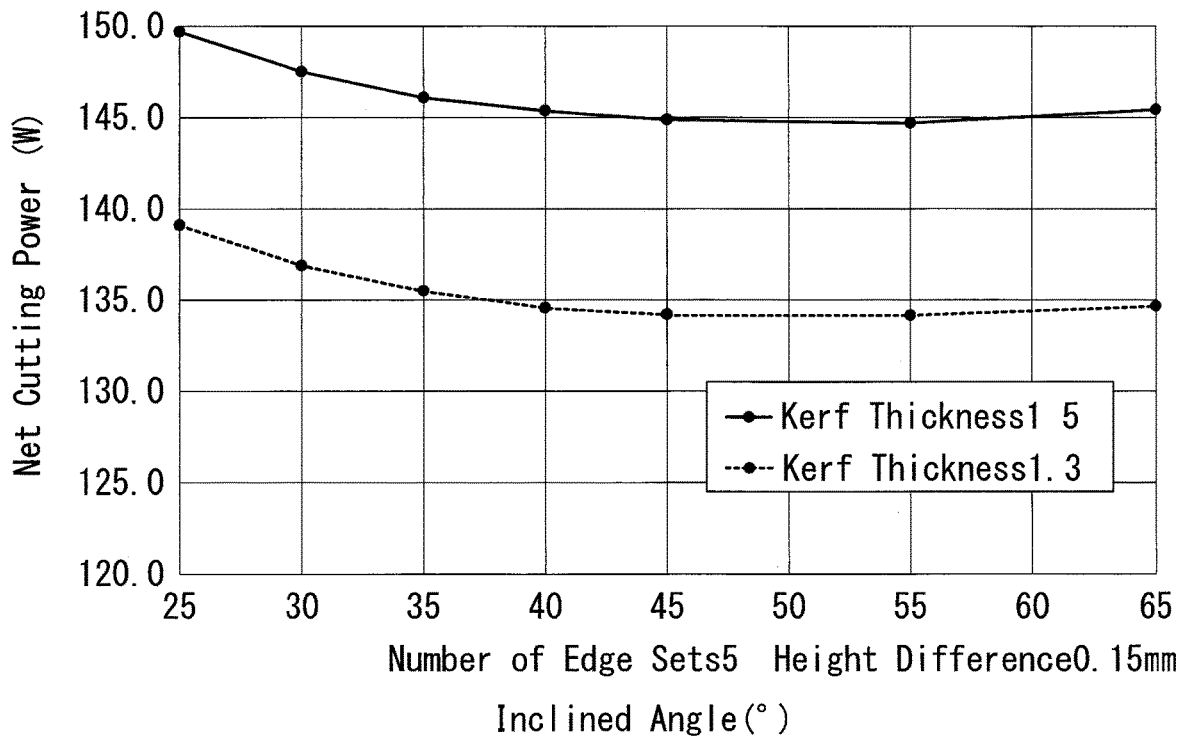
FIG. 8 is a graph illustrating a relationship between inclination angles of the beveled edges and the cutting power.

The inventor conducted simulations to determine how the cutting power changes in regards to the changed inclined angles 22g, 23g, as shown in FIG. 8. The inventor also conducted simulations to determine how the cutting power changes based on the cutting edge line-related length A, which can be calculated from Equations (1) to (3). The simulations were conducted to measure the cutting power for every 5° change of the inclination angles 22g, 23a in the range of 25 to 45°, and for every 10° change in the range of 45 to 65°. The simulations were conducted on a tipped saw blade 1 with a kerf thickness T of 1.3 mm and a tipped saw blade 1 with a kerf thickness of 1.5 mm. In the simulations, the number of edges per group of tips 10 was set to 5 and the height difference 21g to 0.15 mm.

The simulation results show that the cutting power decreases as the inclination angles 22g, 23g increases in the range of 25 to 45°, as shown in FIG. 8. The reduction effect of the cutting power is particularly significant when the inclination angles 22g, 23g are small. For example, when the inclination angles 22g, 23g are changed from 25° to 30°, the cutting power is reduced by about 2%. For example, the cutting power may be reduced by about 0.7% when the inclination angles 22g, 23g are changed from 40° to 45°. The cutting power shows a similar decreasing trend both when the kerf thickness T is 1.3 mm and when it is 1.5 mm.

Further, as shown in FIG. 8, it was found that the cutting power remains substantially unchanged or slightly changes as the inclination angles 22g, 23g increase within the range of 45° to 65°. Additionally, it was found that the left end 22d of the left beveled edge 22 and the right end 23e of the right beveled edge 23 may be chipped when the inclination angles 22g, 23g are set to greater than 65°. Therefore, it is preferable to set the inclination angles 22g, 23g to be smaller than or equal to 65°. From the above, it was determined that the cutting power is reduced when the inclination angles 22g, 23g are greater than 30°, and that the reduction effect of the cutting power is significant when the inclination angles 22g, 23g are 30° to 45°. The left end 22d and the right end 23e may be provided with an R-chamfering, a flat section of about 0.1 mm, and/or a C-chamfering, etc.

As described above, the tipped saw blade 1 includes a disc-shaped base metal 2 as shown in FIGS. 1, 2, and 4, and a plurality of first to ninth tips 11 to 19 joined at and around the radially outer periphery the base metal 2. The plurality of first to ninth tips 11 to 19 include a plurality of flat edges 21, a plurality of left beveled edges 22, and a plurality of right beveled edges 23. Each flat edge 21 includes a cutting edge 21c that is oriented parallel to the thickness direction of the base metal 2 and the central axis of rotation of the tipped saw blade 1. The left beveled edge 22 and the right beveled edge 23 include cutting edges 22c, 23c that are inclined with respect to the thickness direction of the base metal 2. The lengths of the portions of the cutting edges 21c, 22c, 23c that come into contact with the workpiece 40 while cutting the workpiece 40 are referred to as the cutting edge line lengths 31a to 39a. The cutting edge line lengths 30a, 32a, 33a corresponding to the cutting edge line lengths 31a to 39a, respectively, when the feed rate per edge Sz is set to 0 mm/edge. The cutting edge line 30 is determined to be the cutting edge line first formed when the flat edge 21 of the first tip 11 cuts the workpiece 40. The left beveled edge 22 of the second tip 12 and the right beveled edge 23 of the third tip 12, which are in the same group of tips 10, cut the workpiece 40 immediately after the flat edge 21, thereby forming the cutting edge lines 32, 33. These cutting edge lines 32, 33 are assumed to be the cutting edge lines 32 to 39 that are formed by the left beveled edges 22 and the right beveled edges 23 of the second to ninth tips 12 to 19, respectively. The cutting edge line lengths 30a, 32a, 33a are determined from the assumed cutting edge lines 30, 32 to 39. The cutting edge line lengths 30a, 32a, 33a are set to satisfy the following relationship:

(The sum of cutting edge line lengths 32a,33a of a plurality of left beveled edges 22 and right beveled edges 23)<[((the cutting edge line length 30a of flat edge 21 per piece)−(the kerf thickness $T$ of tipped saw blade 1)+1.5)×(number of edges of a plurality of flat edges 21)×1.2]

The left beveled edge 22 and right beveled edge 23 shown in FIG. 4 serve to smoothen the lateral surfaces of the groove 41 in FIG. 5, which defines a cut surface. Therefore, it is preferable that the tipped saw blade 1 includes the left beveled edges 22 and right beveled edges 23. On the other hand, investigation by the inventor revealed that the cutting edge line length 30a (31a) of the flat edge 21 affects the cutting power more significantly than the cutting edge line lengths 32a, 33a of the left beveled edges 22 and right beveled edges 23. This suggests not to reduce the cutting edge line length 30a of the flat edge 21, but instead to increase the cutting edge line length 30a of the flat edge 21 and to reduce the cutting edge line lengths 32a, 33a of each of the beveled edges 22, 23. By discovering that there is more of an influence by the cutting edge line length 30a of the flat edge 21, a reduction in the cutting power can be achieved as compared with conventional designs.

As shown in FIGS. 1, 4, and 15, the tipped saw blade 1 includes a disc-shaped base metal 2 and a plurality of groups of tips 10, each group of tips 10 including a plurality of first to ninth tips 11 to 19 joined at and around a radially outer periphery of the base metal 2. The plurality of first to ninth tips 11 to 19 include a plurality of tips having a flat edge 21, a plurality of tips having left beveled edge 22, and a plurality of tips having right beveled edge 23. Each flat edge 21 includes a cutting edge 21c oriented parallel to the thickness direction of the base metal 2 and the central axis of rotation of the tipped saw blade 1. The left beveled edge 22 and the right beveled edge 23 include the cutting edges 22c, 23c that are inclined with respect to the thickness direction of the base metal 2. The lengths of the portion of the cutting edges 21c, 22c, 23c that come into contact with the workpiece 40 while cutting the workpiece 40 are referred to as the cutting edge line lengths 31a to 39a. The sum of the cutting edge line lengths 32a to 39a of the plurality of left beveled edges 22 and right beveled edges 23 is less than or equal to two times the sum of the cutting edge line lengths 31a of the plurality of flat edges 21. Therefore, the sum of the cutting edge line lengths 32a to 39a of the plurality of left beveled edges 22 and right beveled edges 23 is small. This allows the cutting power to be reduced as compared to conventional designs. The cutting power can be reduced as compared to conventional designs, especially if the kerf thickness T is in the range of 1.0 mm to 2.0 mm. In particular, this effect is significant when the kerf thickness T is 1.5 mm.

As shown in FIGS. 1, 4, and 15, the tipped saw blade 1 includes a disc-shaped base metal 2 and a plurality of first to ninth tips 11 to 19 joined at and around a radially outer periphery of the base metal 2. The plurality of first to ninth tips 11 to 19 include a plurality of flat edges 21, a plurality of left beveled edges 22, and a plurality of right beveled edges 23. Each flat edge 21 includes a cutting edge 21c that is oriented parallel to the thickness direction of the base metal 2 and the central axis of rotation of the tipped saw blade 1. The left beveled edge 22 and right beveled edge 23 include the cutting edges 22c, 23c that are inclined with respect to the thickness direction of the base metal 2. The lengths of the portion of the cutting edges 21c, 22c, 23c that come into contact with the workpiece 40 while cutting the workpiece 40 are referred to as the cutting edge line lengths 31a to 39a. The cutting edge line lengths 30a, 32a, 33a corresponding to the cutting edge line lengths 31a to 39a, respectively, will be determined when the feed rate per edge Sz is set to 0 mm/edge. The cutting edge line 30 is determined to be the cutting edge line formed when the flat edge 21 of the first tip 11 first cuts the workpiece 40. The left beveled edge 22 of the second tip 12 and the right beveled edge 23 of the third tip 12 in the same group of tips 10 cut the workpiece 40 immediately after the flat edge 21 to form the cutting edge lines 32, 33. These cutting edge lines 32, 33 are assumed to be the cutting edge lines 32 to 39 that are formed by the left beveled edges 22 and the right beveled edges 23 of the second to ninth tips 12 to 19, respectively. The cutting edge line lengths 30a, 32a, 33a are determined from the assumed cutting edge lines 30, 32 to 39. The cutting edge line lengths 30a, 32a, 33a satisfy the following relationship:

cutting edge line-related length $A=[((\text{sum of cutting edge line lengths } 30a \text{ of a plurality of flat edges } 21) \times 2) + (\text{sum of cutting edge line lengths } 32a, 33a \text{ of a plurality of left beveled edges 23 and right beveled edges 23})]/(\text{total number of edges of a plurality of flat edges 21, a plurality of left beveled edges 11 and right beveled edges 23})$ cutting edge line-related length $A < [(\text{kerf thickness } T \text{ of tipped saw blade 1}) \times 0.2 + 0.2]$ Investigations by the inventor revealed that there is a correlation between the cutting edge line-related length A and the cutting power. In other words, it was found that the cutting power could be estimated from the cutting edge line-related length A. The plurality of flat edges 21 and the plurality of left beveled edges 22 and right beveled edges 23 are provided such that the cutting edge line-related length A satisfies the above-relationship. As a result, the cutting edge line-related length A is reduced as compared with conventional products. Therefore, the cutting power can be reduced as compared with conventional designs.

As shown in FIGS. 1 and 4, the plurality of first to ninth tips 11 to 19 includes a plurality of groups of tips 10, each of which including one flat edge 21 and a total of six or more left beveled edges 22 and right beveled edges 23. The flat edge 21, left beveled edges 22, and right beveled edges 23 are aligned in a circumferential direction of the base metal 2. The height difference between the flat edge 21 and the left beveled edges 22 or right beveled edges 23 in the radial direction of the base metal 2 is less than or equal to 0.15 mm. The inclination angles 22g, 23a of the left beveled edge and right beveled edge 23 are greater than or equal to 30° and less than 90°.

Therefore, each of the groups of tips 10 includes at least six left beveled edges 22 and right beveled edges 23 and one flat edge 21. The sum of the cutting edge lengths 32a to 39a of the plurality of left beveled edges 22 and right beveled edges 23 is less than or equal to two times the sum of the cutting edge line lengths 31a of the plurality of the flat edges 21. As a result, the cutting edge line length of each individual left beveled edge 22 or right beveled edge 23 is small. In addition, the height difference between the left beveled edges 22 and right beveled edges 23 with respect to the flat edge 21 is small, such as less than or equal to 0.15 mm in the radial direction of the base metal 2. Furthermore, the inclination angles 22g, 23a of the left beveled edges 22 and right beveled edges 23 are large, for instance greater than or equal to 30° and less than 90°. The cutting edge lines 32 to 39 of the left beveled edges 22 and right beveled edges 23 thus intersect the cutting edge lines 30, 31 of the flat edge 21 at positions closer to the left and right ends of the groove 41. Therefore, the cutting edge line lengths 32a to 39a of each of the beveled edges 22, 23 are smaller. Thus the cutting power is also small.

Further, cutting chips generated by cutting the left and right ends of the groove 41 shown in FIG. 5 with the left beveled edges 22 and right beveled edges 23 are reduced in size. This is due in part to the cutting edge line length of the left beveled edges 22 and right beveled edges 23 per piece being reduced in size. This facilitates discharging the cutting chips from the left and right ends of the groove 41. This also results in a cut surface of the workpiece 40 being made smoother.

As shown in FIGS. 4 and 5, the plurality of beveled edges includes the plurality of left beveled edges 22 and the plurality of right beveled edges 23. The left beveled edges 22 and right beveled edges 23 are alternately arranged. The left ends 22d of the left beveled edges 22 project radially outward from the base metal (see FIG. 1), as seen from the front in the circumferential direction of the cutting edges 22c. The right ends 23e of the right beveled edges 23 project radially outward of the base metal 2. Therefore, the left and right sides of the grooves 41 can be cut alternately in a well-balanced manner. In addition, the cutting chips are alternately generated on the left and right sides of the groove 41. In other words, the cutting chips are generated on the left and right sides of the groove 41, respectively at predetermined time intervals. This allows cutting chips to be smoothly discharged from the both the left and right sides of the groove 41.

Various modifications may be made to the tipped saw blade 1 of the present embodiments described above. For example, each group of tips 10 in the above embodiments includes one flat edge 21. Instead, each group of tips 10 may include two or more flat edges 21. For example, as described-above, each group of tips 10 includes four left beveled edges 22 and four right beveled edges 23. Instead, the number of left beveled edges 22 and right beveled edges 23 included in each group of tips 10 may not be the same. Alternatively, each group of tips 10 may include only the flat edge 21 and the left beveled edges 22 or only the flat edge 21 and the right beveled edges 23.

For example, as described-above, each group of tips 10 includes the left beveled edges 22 and right beveled edges 23 circumferentially arranged in an alternating manner around the base metal 2. Alternatively, the circumferential arrangement order of the flat edges 21, left beveled edges 22, and right beveled edges 23 may be appropriately changed. For example, the left beveled edges 22 may be arranged circumferentially adjacent each other. For example, as described-above, the tipped saw blade 1 may include a plurality of sets of groups of tips 10, each of which includes the flat edge 21, left beveled edges 22, and right beveled edges 23 arranged in the same circumferential order. Alternatively, the tipped saw blade 1 may include groups of tips 10 each of which includes the flat edge 21, left beveled edges 22, and right beveled edges 23 arranged in a different circumferential order.

As described-above, the left beveled edges 22 and right beveled edges 23 have inclination angles 22g, 23 oriented at the same angle. Alternatively, for example, the inclination angles 22g, 23g of the left beveled edges 22 and right beveled edges 2 may have various different angles, such as 30°, 35°, or 40°. Alternatively, the radial heights of the cutting edge 21c, left end 22d, and/or right end 23e of each of the tips 11 to 19 may be different. An outer diameter of the tipped saw blade 1 or interval (pitch) between each edge may be made different, such that the feed rate per edge Sz of each edge at the left end 22d and right end 23e is the same. For example, a profile of each projection 4 and each gullet 5 may be appropriately changed such that each edge has a predetermined interval. In the present disclosure, the flat edge has been described as having a linear cutting edge. However, it may instead have a different shape, such as a U-shape or a V-shape. It is preferable that the cutting edge line length has a short linear-shape, as described. A projecting amount (setting amount) of the left end 21d of the left side face 21h of the flat edge 21 and a setting amount of the left end 23d of the left side face 23h of the right beveled edge 23 may be made smaller than a setting amount of the left end of the left side face 22h of the left beveled edge 22. Similarly, a setting amount of the right end 21e of the flat edge 21 and a setting amount of the right end 22e of the left beveled edge 22 may be made smaller than a setting amount of the right end 23e of the right beveled edge 23.

Figure 14:
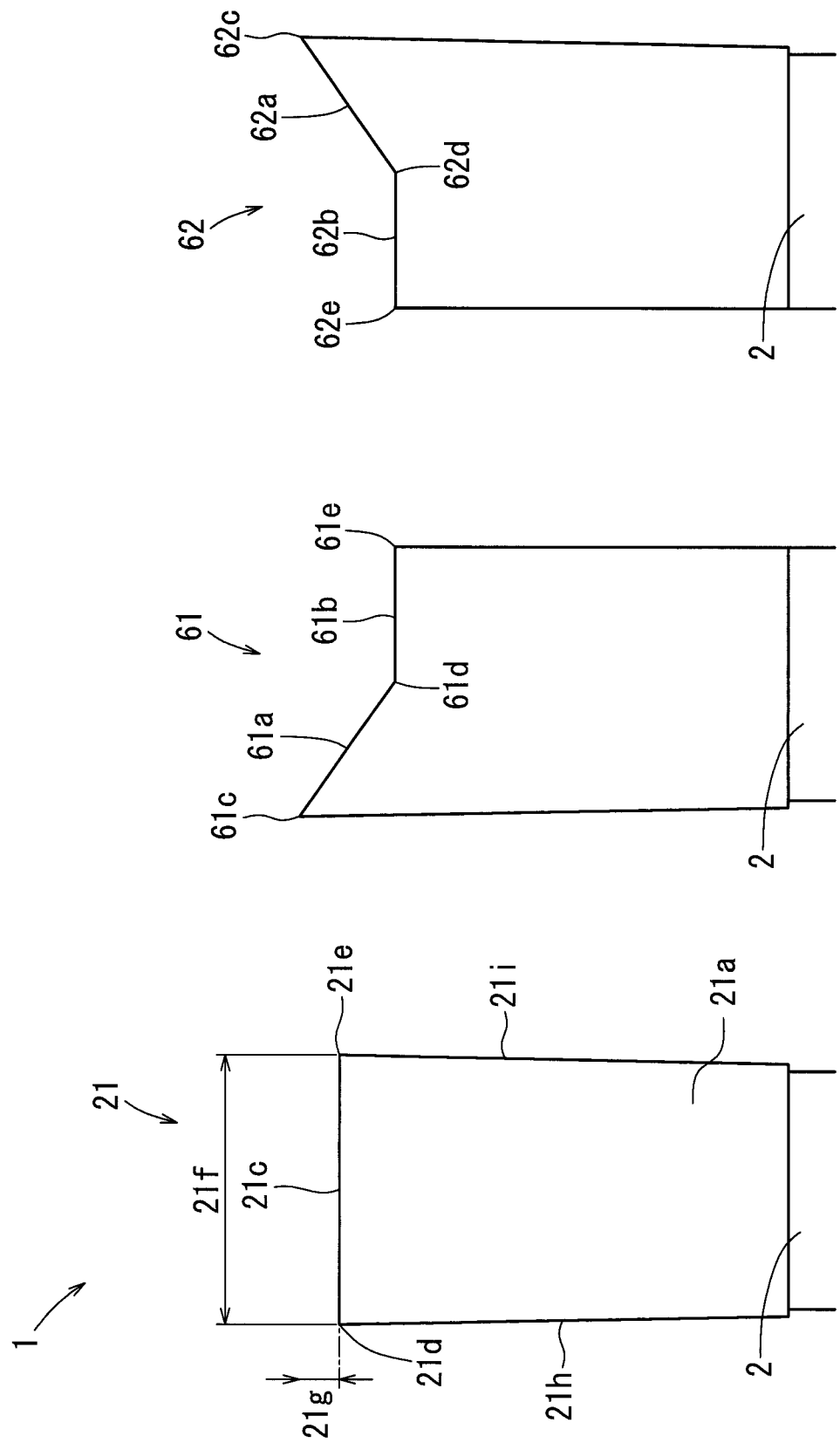
FIG. 14 is a view of embodiments of beveled edges in accordance with principles described herein as seen in the circumferential direction of the base metal.

Instead of the left beveled edges 22 and right beveled edges 23 shown in FIG. 4, the tipped saw blade 1 may be provided with, for example, left beveled edges 61 and right beveled edges 62. The left and right beveled edges 61, 62 may be formed such that cutting edges having a lateral width smaller than the kerf thickness T, as shown in FIG. 14. The left beveled edge 61 has a cutting edge 61a that is inclined radially inward of the base metal 2 from a left end 61c to the right. The cutting edge 61a has the same inclination angle (sharpening angle) as the cutting edge 22c descried above. The cutting edge 61a of this embodiment extends up to a cutting edge end 61d, which is in the center of the left beveled edge 61 in the left and right direction. The left beveled edge 61 includes a horizontal end portion 61b extending from the cutting edge end 61d to the right end 61e. The right beveled edge 62 has a profile corresponding to a mirror image of the left beveled edge 61 in the left-to-right direction. In other words, the right beveled edge 62 includes a cutting edge 62a that is inclined. The cutting edge 62a extends radially inward of the base metal 2 from the right end 62c to the cutting edge end 62d located in the center of the right beveled edge 62. The right beveled edge 62 also includes a horizontal end 62b extending from the cutting edge end 62d to the left end 62e. It is also possible to form cutting edge lines by cutting both the left and right ends of the groove 41 (see FIG. 5) of the workpiece 40 using the cutting edges 61a, 62 of the left beveled edges 61 and right beveled edges 62.

The invention claimed is:
1. A tipped saw blade having a central axis of rotation, the tipped saw blade comprising:
   a disc-shaped base metal; and
   a plurality of circumferentially-adjacent tips extending from and positioned about a radially outer periphery of the base metal, wherein:
   the plurality of tips includes at least one first tip, a plurality of second tips, and a plurality of third tips;
   each of the at least one first tip includes a flat edge having a cutting edge oriented parallel to the central axis and positioned at a first radial distance from the central axis;
   each of the plurality of second tips includes a first beveled edge having a cutting edge inclined relative to the central axis;
   each of the plurality of third tips includes a second beveled edge having a cutting edge inclined relative to the central axis;
   a length of a portion of the cutting edge of the first beveled edge that is positioned radially further away from the central axis than the cutting edge of the flat edge defines a first beveled cutting edge line length;
   a length of a portion of the cutting edge of the second beveled edge that is positioned radially further away from the central axis than the cutting edge of the flat edge defines a second beveled cutting edge line length;
   a length of a portion of the cutting edge of the flat edge positioned axially between the cutting edge of the first beveled edge and the cutting edge of the second beveled edge at the first radial distance defines a first flat cutting edge line length; and the first beveled cutting edge line length, the second beveled cutting edge line length, and the first flat cutting edge line length satisfy the following relationship:

((the first beveled cutting edge line length)×(a number of the second tips+(the second beveled cutting edge line length)×(a number of the third tips)≤[((the first flat cutting edge line length)−(a distance between outer edges of the cutting edge of the first beveled edge and the second beveled edge in an axial direction of the base metal+1.5))×(a number of the first tips)×1.2].

2. The tipped saw blade of claim 1, wherein the flat edges of the at least one first tip, the first beveled edges of the plurality of second tips, and the second beveled edges of the plurality of third tips are grouped into a plurality of groups of tips, wherein each group of tips includes one flat edge and six or more beveled edges of the first beveled edges and the second beveled edges arrange in a circumferentially adjacent manner about the base metal; and wherein a radial height difference between the flat edge, the first beveled edges, and the second beveled edges in each group of tips is less than or equal to 0.15 mm, and an inclination angle of each first beveled edge and each second beveled edge is greater than or equal to 30° and less than 90°.

3. The tipped saw blade of claim 1, wherein:
each first beveled edge is a left beveled edge with a left end projecting radially outward in front view relative to a direction of rotation of the tipped saw blade about the central axis;
each second beveled edge is a right beveled edge with a right end projecting radially outward in front view relative to a direction of rotation of the tipped saw blade about the central axis; and
the left beveled edges and the right beveled edges are circumferentially arranged in an alternating manner.

4. A tipped saw blade having a central axis of rotation, the tipped saw blade comprising:
a disc-shaped base metal; and
a plurality of circumferentially adjacent tips joined to and disposed about a radially outer periphery of the base metal, wherein:
the plurality of tips includes a plurality of first tips, a plurality of second tips, and a plurality of third tips;
each of the first tips includes a flat edge having a cutting edge oriented parallel to the central axis and positioned at a first radial distance from the central axis;
each of the second tips includes a first beveled edge having a cutting edge inclined relative to the central axis;
each of the third tips includes a second beveled edge having a cutting edge inclined relative to the central axis;
a length of a portion of the cutting edge of the first beveled edge of each second tip positioned radially further away from the central axis than the cutting edge of each flat edge defines a first beveled cutting edge line length;
a length of a portion of the cutting edge of the second beveled edge of each third tip positioned radially further away from the central axis than the cutting edge of each flat edge defines a second beveled cutting edge line length;
a length of a portion of the cutting edge of each flat edge of each first tip positioned axially between the cutting edges of the first beveled edges and the cutting edges of the second beveled edges at the first radial distance from the central axis defines a first flat cutting edge line length; and
a sum of the first beveled cutting edge line lengths and the second beveled cutting edge line lengths is less than or equal to two times a sum of the first flat cutting edge line lengths.

5. The tipped saw blade of claim 4, wherein the plurality of flat edges and a plurality of beveled edges are grouped into a plurality of groups of tips, wherein each group of tips includes one flat edge of the plurality of flat edges and six or more beveled edges of the plurality of first beveled edges and the plurality of second beveled edges arranged circumferentially adjacent one another; and
wherein a radial height difference between the flat edge and the beveled edges in each group of tips is less than or equal to 0.15 mm, and an inclination angle of each beveled edge is greater than or equal to 30° and less than 90°.

6. The tipped saw blade of claim 4, wherein:
each first beveled edge is a left beveled edge with a left end projecting radially outward in front view relative to a direction of rotation of the tipped saw blade about the central axis;
each second beveled edge is a right beveled edge with a right end projecting radially outward in front view relative to a direction of rotation of the tipped saw blade about the central axis; and
the left beveled edges and the right beveled edges are circumferentially arranged in an alternating manner.

7. A tipped saw blade having a central axis of rotation, the tipped saw blade comprising:
a disc-shaped base metal; and
a plurality of circumferentially adjacent tips joined to and disposed about radially outer periphery of the base metal, wherein:
the plurality of tips includes a plurality of first tips, a plurality of second tips, and a plurality of third tips;
each of the first tips includes a flat edge having a cutting edge oriented parallel to the central axis and disposed at a first radial distance from the central axis;
each of the second tips includes a first beveled edge having a cutting edge inclined relative to the central axis;
each of the third tips includes a second beveled edge having a cutting edge inclined relative to the central axis;
a length of a portion of the cutting edge of the first beveled edge of each second tip positioned radially further away from the central axis than the cutting edge of the flat edge of each first tip defines a first beveled cutting edge line length;
a length of a portion of the cutting edge of the second beveled edge of each third tip positioned radially further away from the central axis than the cutting edge of the flat edge of each first tip defines a second beveled cutting edge line length;
a length of a portion of the cutting edge of the flat edge of each first tip positioned axially between the cutting edge of the first beveled edge of each second tip and the cutting edge of the second beveled edge of each third tip at the first radial distance defines a first flat cutting edge line length; and
the first beveled cutting edge line lengths, the second beveled cutting edge line lengths, and the first flat cutting edge line lengths satisfy the following relationship:

$A=[(((\text{a sum of the first flat cutting edge line lengths})\times 2)+(\text{a sum of the first beveled cutting edge line lengths})+(\text{a sum of the second beveled cutting edge line lengths}))/((\text{a number of the first tips})+(\text{a number of the second tips})+(\text{a number of the third tips}))]$; and $A<[((\text{a distance between outer edges of the cutting edge of the first beveled edge and the second beveled edge in an axial direction of the base metal})\times 0.2)+0.2]$.

8. The tipped saw blade of claim 7, wherein the plurality of flat edges and a plurality of beveled edges are grouped into a plurality of groups of tips, wherein the plurality of beveled edges includes the first beveled edge and the second beveled edge, wherein each group includes one flat edge of the plurality of flat edges and six or more beveled edges of the plurality of beveled edges arrange circumferentially adjacent one another; and wherein a radial height difference between the flat edge and the beveled edges in each group of tips is less than or equal to 0.15 mm, and an inclination angle of each beveled edge is greater than or equal to 30° and less than 90°.

9. The tipped saw blade of claim 7, wherein:

each first beveled edge is a left beveled edge with a left end projecting radially outward in front view relative to a direction of rotation of the tipped saw blade about the central axis;

each second beveled edge is a right beveled edge with a right end projecting radially outward in front view relative to a direction of rotation of the tipped saw blade about the central axis; and the left beveled edges and the right beveled edges are circumferentially arranged in an alternating manner.

* * * * *